(12) United States Patent  (10) Patent No.: US 8,429,240 B2
Usui  (45) Date of Patent: Apr. 23, 2013

(54) DATA TRANSFER DEVICE AND DATA TRANSFER SYSTEM

(75) Inventor: Hiroyuki Usui, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 359 days.

(21) Appl. No.: 12/943,970

(22) Filed: Nov. 11, 2010

(65) Prior Publication Data
US 2012/0047220 A1     Feb. 23, 2012

(30) Foreign Application Priority Data

Aug. 23, 2010   (JP) ................................ 2010-186136

(51) Int. Cl.
*G06F 15/167*     (2006.01)
(52) U.S. Cl.
USPC ........... 709/213; 709/203; 709/227; 709/201; 710/110; 710/100; 710/105; 711/130; 711/163; 711/121; 711/146

(58) Field of Classification Search .................. 709/213, 709/203
See application file for complete search history.

(56) References Cited

U.S. PATENT DOCUMENTS

| | | | |
|---|---|---|---|
| 6,006,019 A * | 12/1999 | Takei ............................ | 709/224 |
| 7,165,128 B2 * | 1/2007 | Gadre et al. .................... | 710/52 |
| 7,774,530 B2 * | 8/2010 | Haug et al. .................... | 710/110 |
| 2006/0034134 A1 * | 2/2006 | Choi et al. ..................... | 365/193 |

FOREIGN PATENT DOCUMENTS
JP     2006-178786     7/2006

* cited by examiner

*Primary Examiner* — Jude Jean Gilles
(74) *Attorney, Agent, or Firm* — Turocy & Watson, LLP

(57) ABSTRACT

According to one embodiment, a data transfer device is provided. The data transfer device is configured to transfer data between a plurality of data transceivers and at least one memory having a first memory area. When one of the data transceivers has acquired an exclusive access right to the first memory area of the memory, the data transfer device stores address information corresponding to the first memory area.

20 Claims, 23 Drawing Sheets

| V | ADDRESS |
|---|---|
| 1 | 0x4000_0000 |
| 0 | — |
| 0 | — |

BUFFER 15 OF EACH OF ROUTERS R11, R12, AND R22

| V | ADDRESS | OUTPUT DESTINATION OF PACKET C1 |
|---|---------|--------------------------------|
|   |         |                                |
|   |         |                                |
|   |         |                                |

15

| V | ADDRESS | TRANSFER DESTINATION OF PACKET C1 |
|---|---------|-----------------------------------|
| 1 | 0x4000_0000 | X+ |
| 0 | — | — |
| 0 | — | — |

BUFFER 15 OF ROUTER R11a

FIG.12A

| V | ADDRESS | TRANSFER DESTINATION OF PACKET C1 |
|---|---------|-----------------------------------|
| 1 | 0x4000_0000 | Y+ |
| 0 | — | — |
| 0 | — | — |

BUFFER 15 OF ROUTER R12a

FIG.12B

| V | ADDRESS | TRANSFER DESTINATION OF PACKET C1 |
|---|---------|-----------------------------------|
| 1 | 0x4000_0000 | Y+ |
| 0 | — | — |
| 0 | — | — |

BUFFER 15 OF ROUTER R22a

FIG.12C

| V | ADDRESS | TRANSFER DESTINATION OF PACKET C1 | TRANSFER DESTINATION OF PACKET B2 | | | |
|---|---|---|---|---|---|---|
| | | | X+ | X− | Y+ | Y− |
| 1 | 0x4000_0000 | Y+ | 0 | 0 | 0 | 0 |
| 0 | | — | — | — | — | — |
| 0 | | — | — | — | — | — |

BUFFER 15 OF ROUTER R22b

| V | ADDRESS | TRANSFER DESTINATION OF PACKET C1 | TRANSFER DESTINATION OF PACKET B2 | | | |
|---|---|---|---|---|---|---|
| | | | X+ | X− | Y+ | Y− |
| 1 | 0x4000_0000 | Y+ | 1 | 0 | 0 | 0 |
| 0 | | — | — | — | — | — |
| 0 | | — | — | — | — | — |

BUFFER 15 OF ROUTER R22b

FIG.18A

| V | ADDRESS | TRANSFER DESTINATION OF PACKET C1 | TRANSFER DESTINATION OF PACKET B2 | | | |
|---|---|---|---|---|---|---|
| | | | X+ | X− | Y+ | Y− |
| 1 | 0x4000_0000 | — | 0 | 0 | 0 | 1 |
| 0 | | — | — | — | — | — |
| 0 | | — | — | — | — | — |

BUFFER 15 OF ROUTER R23b

FIG.18B

| V | ADDRESS | TRANSFER DESTINATION OF PACKET C1 | TRANSFER DESTINATION OF PACKET B2 | | | |
|---|---|---|---|---|---|---|
| | | | X+ | X− | Y+ | Y− |
| 1 | 0x4000_0000 | — | 0 | 0 | 0 | 1 |
| 0 | | — | — | — | — | — |
| 0 | | — | — | — | — | — |

BUFFER 15 OF ROUTER R13b

FIG.18C

| V | ADDRESS | TRANSFER DESTINATION OF PACKET C1 | TRANSFER DESTINATION OF PACKET B2 | | | |
|---|---|---|---|---|---|---|
| | | | X+ | X− | Y+ | Y− |
| 1 | 0x4000_0000 | Y+ | 1 | 0 | 0 | 1 |
| 0 | | — | — | — | — | — |
| 0 | | — | — | — | — | — |

BUFFER 15 OF ROUTER R13b

FIG.19A

| V | ADDRESS | TRANSFER DESTINATION OF PACKET C1 | TRANSFER DESTINATION OF PACKET B2 | | | |
|---|---|---|---|---|---|---|
| | | | X+ | X− | Y+ | Y− |
| 1 | 0x4000_0000 | — | 0 | 0 | 0 | 1 |
| 0 | | — | — | — | — | — |
| 0 | | — | — | — | — | — |

BUFFER 15 OF ROUTER R14b

FIG.19B

| V | ADDRESS | COUNTER |
|---|---|---|
| | | |
| | | |
| | | |

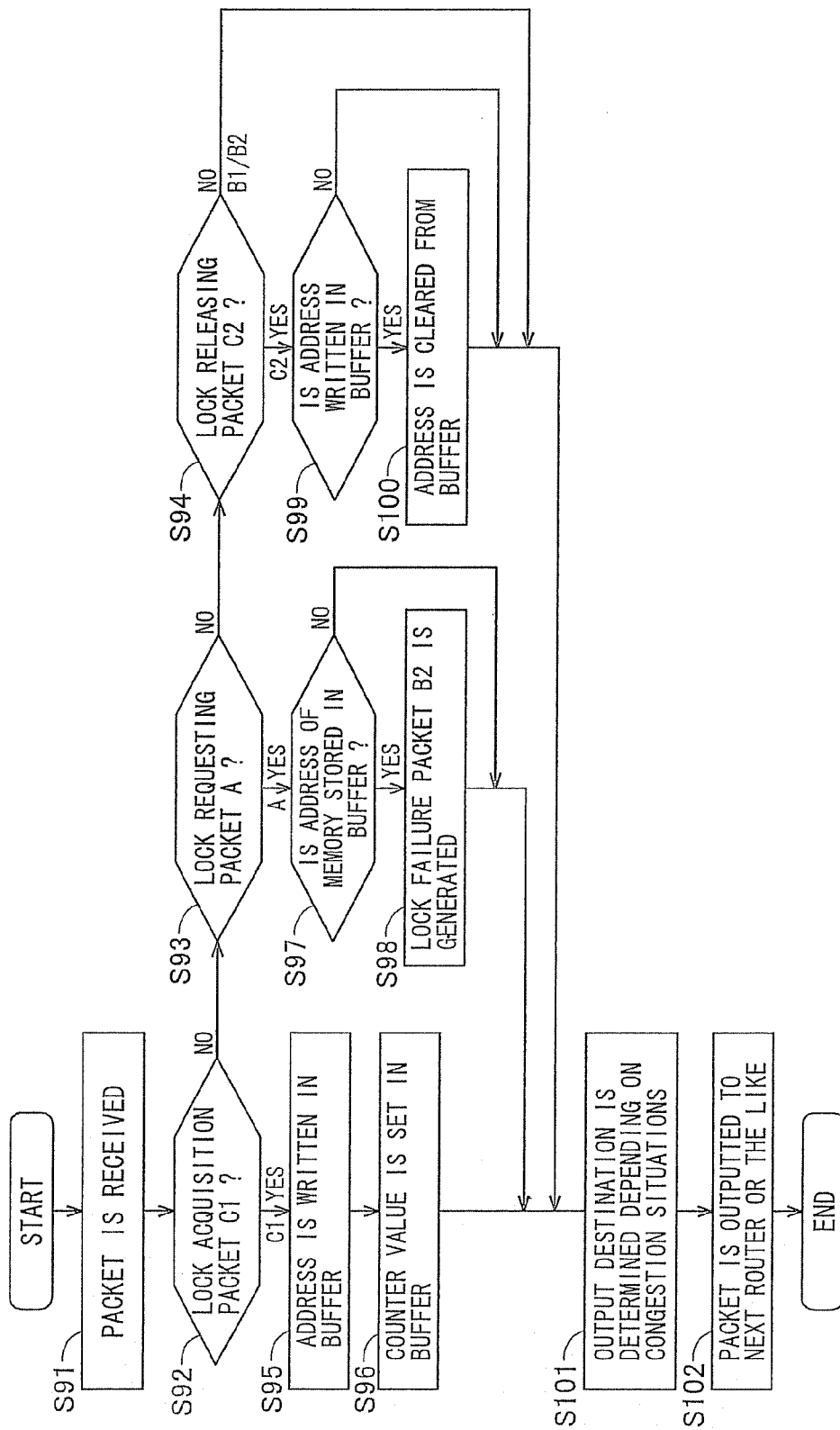
F I G. 22

| V | ADDRESS | COUNTER |
|---|---|---|
| 1 | 0x4000_0000 | 0x1000 |
| — | — | — |
| — | — | — |

BUFFER 15 OF ROUTER R11c

| V | ADDRESS | COUNTER |
|---|---|---|
| 1 | 0x4000_0000 | 0x0F00 |
| — | — | — |
| — | — | — |

BUFFER 15 OF ROUTER R12c

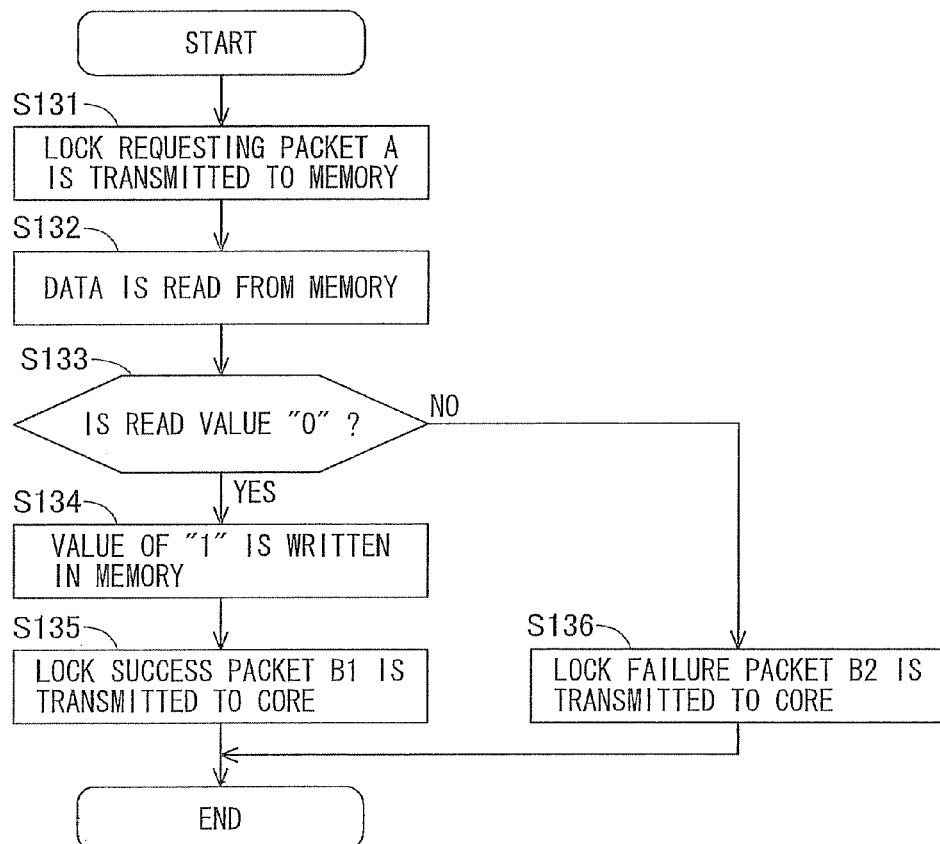

| V | ADDRESS | INPUT SOURCE OF PACKET B1 |
|---|---------|---------------------------|
|   |         |                           |
|   |         |                           |
|   |         |                           |

| V | ADDRESS | INPUT SOURCE OF PACKET B1 |
|---|---|---|
| 1 | 0x4000_0000 | Y+ |
| 0 | — | — |
| 0 | — | — |

BUFFER 15 OF ROUTER R22f

FIG.31A

| V | ADDRESS | INPUT SOURCE OF PACKET B1 |
|---|---|---|
| 1 | 0x4000_0000 | Y+ |
| 0 | — | — |
| 0 | — | — |

BUFFER 15 OF ROUTER R12f

FIG.31B

| V | ADDRESS | INPUT SOURCE OF PACKET B1 |
|---|---|---|
| 1 | 0x4000_0000 | X+ |
| 0 | — | — |
| 0 | — | — |

BUFFER 15 OF ROUTER R11f

FIG.31C

DATA TRANSFER DEVICE AND DATA TRANSFER SYSTEM

CROSS REFERENCE TO RELATED APPLICATIONS

This application is based upon and claims the benefit of priority from the prior Japanese Patent Application No. 2010-186136, filed on Aug. 23, 2010, the entire contents of which are incorporated herein by reference.

FIELD

Embodiments described herein relate generally to data transfer device and data transfer system.

BACKGROUND

In recent years, a multi-core system is used in a personal computer and so on where each memory is shared among a plurality of cores. The multi-core system makes it possible to simplify the control of memory access when one process is performed by two or more cores cooperatively. Further, since each memory can be accessed from a plurality of cores, memory resources can be used efficiently.

In the multi-core system, there is a likelihood that when a useless data transfer is performed between the core and the memory, another data transfer is obstructed and the performance of the entire system is deteriorated.

BRIEF DESCRIPTION OF THE DRAWINGS

FIG. 12A is an example of the setting of the buffer 15 in the router R11a of the second embodiment.

FIG. 12B is an example of the setting of the buffer 15 in the router R12a of the second embodiment.

FIG. 12C is an example of the setting of the buffer 15 in the router R22a of the second embodiment.

FIG. 13 is a configuration diagram showing an example of the configuration of the buffer 15 in the router in the third embodiment.

FIG. 18A is an example of the setting of the buffer 15 in the router R22b of the third embodiment.

FIG. 18B is an example of the setting of the buffer 15 in the router R23b of the third embodiment.

FIG. 18C is an example of the setting of the buffer 15 in the router R13b of the third embodiment.

FIG. 19A is an example of the setting of the buffer 15 in the router R13b of the third embodiment.

FIG. 19B is an example of the setting of the buffer 15 in the router R14b of the third embodiment.

FIG. 20 is a configuration diagram showing an example of the configuration of the buffer 15 in the router.

FIG. 22 is a flowchart showing an example of the processing operation performed by the router in the fourth embodiment.

FIG. 26A is an example of the setting of the buffer 15 in the router R12d of the fifth embodiment.

FIG. 26B is an example of the setting of the buffer 15 in the router R13d of the fifth embodiment.

FIG. 27 is a flowchart showing the steps for performing a Test & Set access based on another method.

FIG. 29 is a configuration diagram showing an example of the configuration of the buffer 15 in the router in the seventh embodiment.

FIG. 31A is an example of the setting of the buffer 15 in the router R22f of the seventh embodiment.

FIG. 31B is an example of the setting of the buffer 15 in the router R12f of the seventh embodiment.

FIG. 31C is an example of the setting of the buffer 15 in the router R11f of the seventh embodiment.

DETAILED DESCRIPTION

Figure 1:
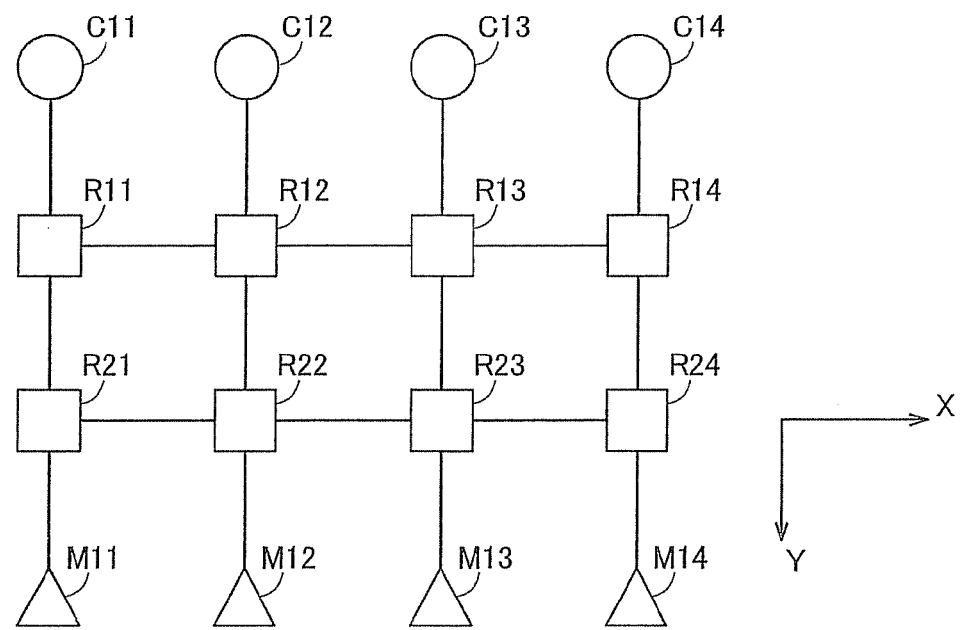
FIG. 1 is a schematic block diagram of a data transfer system according to a first embodiment.

In general, according to one embodiment, a data transfer device is provided. The data transfer device is configured to transfer data between a plurality of data transceivers and at least one memory having a first memory area. When one of the data transceivers has acquired an exclusive access right to the first memory area of the memory, the data transfer device stores address information corresponding to the first memory area.

Hereinafter, embodiments of the data transfer device and the data transfer system will be specifically explained referring to the drawings.

(First Embodiment)

FIG. 1 is a schematic block diagram of a data transfer system according to a first embodiment. The data transfer system of FIG. 1 has: cores (data transceivers) C11 to C14; routers (data transfer devices) R11 to R24; and memories M11 to M14. FIG. 1 shows four cores C11 to C14, eight routers R11 to R24, and four memories M11 to M14, but the configuration of the data transfer system is not limited to FIG. 1 as long as the data transfer system has two or more cores and at least one router and memory.

The data transfer system is mounted on a personal computer, for example. The data transfer system of FIG. 1 may be entirely incorporated into one chip or may be distributed to be incorporated into a plurality of chips. For example, only the memories M11 to M14 may be incorporated into another chip.

Each of the cores C11 to C14 is a processor for performing a process such as image processing and speech processing. Instead, one process may be performed by two or more cores. The routers R11 to R24 are arranged in the X direction and the Y direction to form a matrix-like arrangement, and data transfer is performed between the cores C11 to C14 and the memories M11 to M14. The memories M11 to M14 are used to store various data required in the processes performed by the cores C11 to C14.

The data transfer system of FIG. 1 is a multi-core system where a plurality of the cores C11 to C14 can access any one of the memories M11 to M14 through the routers R11 to R24. By employing such a structure, one process can be performed by two or more cores cooperatively. Further, since each memory can be accessed from a plurality of cores, memory resources can be used efficiently.

Normally, the cores C11 to C14 can access the memories in parallel, but there is a case where a series of operations (from a reference operation to an update operation, for example) should be exclusively performed on data on a certain memory. In this case, while a certain core uses the data, the other cores cannot use the data. That is, two or more cores cannot simultaneously access the same data. Therefore, the core should firstly acquire a lock serving as an exclusive access right to the data to be accessed. The core uses the data after having acquired the lock, and releases the lock after using the data.

Here, the memory M11 has addresses 0x2000_0000 to 3000_FFFF (0x represents a hexadecimal number). Addresses 0x3000_0000 to 0x3000_FFFF are a data writing area (first memory area) to store the data (image data, for example) required for the process performed by the core. Since this data requires the exclusive access, the address 0x2000_0000 is used as a lock control address (address information) for the data. For example, when the data stored in the lock control address 0x2000_0000 is set to be low, the data on the data writing area 0x3000_0000 to 0x3000_FFFF is not accessed from any core and thus can be locked. On the other hand, when the data stored in the lock control address 0x2000_0000 is set to be high, the data on the data writing area 0x3000_0000 to 0x3000_FFFF is accessed from one of the cores and thus cannot be locked by the other cores.

Further, the memory M12 has addresses 0x4000_0000 to 0x5000_FFFF, the memory M13 has addresses 0x6000_0000 to 0x7000_FFFF, and the memory M14 has addresses 0x8000_0000 to 0x9000FFFF. The data structure in each memory is similar to that in the memory M11.

Hereinafter, in the present specification, the process of writing data in the data writing area of the memory is described simply as "writing data on the memory." Similarly, the data written in the data writing area of the memory is described simply as "the data on the memory."

Data is transferred between the cores C11 to C14 and the memories M11 to M14 on a packet basis. The packet has a Header Flit arranged at the head thereof and a Body Flit following the Header Flit. The Header Flit includes information concerning the transmission destination and transmission source of the packet, the kind of the packet, and so on. The Body Flit includes the data to be written in the memories M11 to M14, the data read from the memories M11 to M14, and so on. The end of the Body Flit is called a Tail Flit, which shows the termination of the packet.

Figure 2:
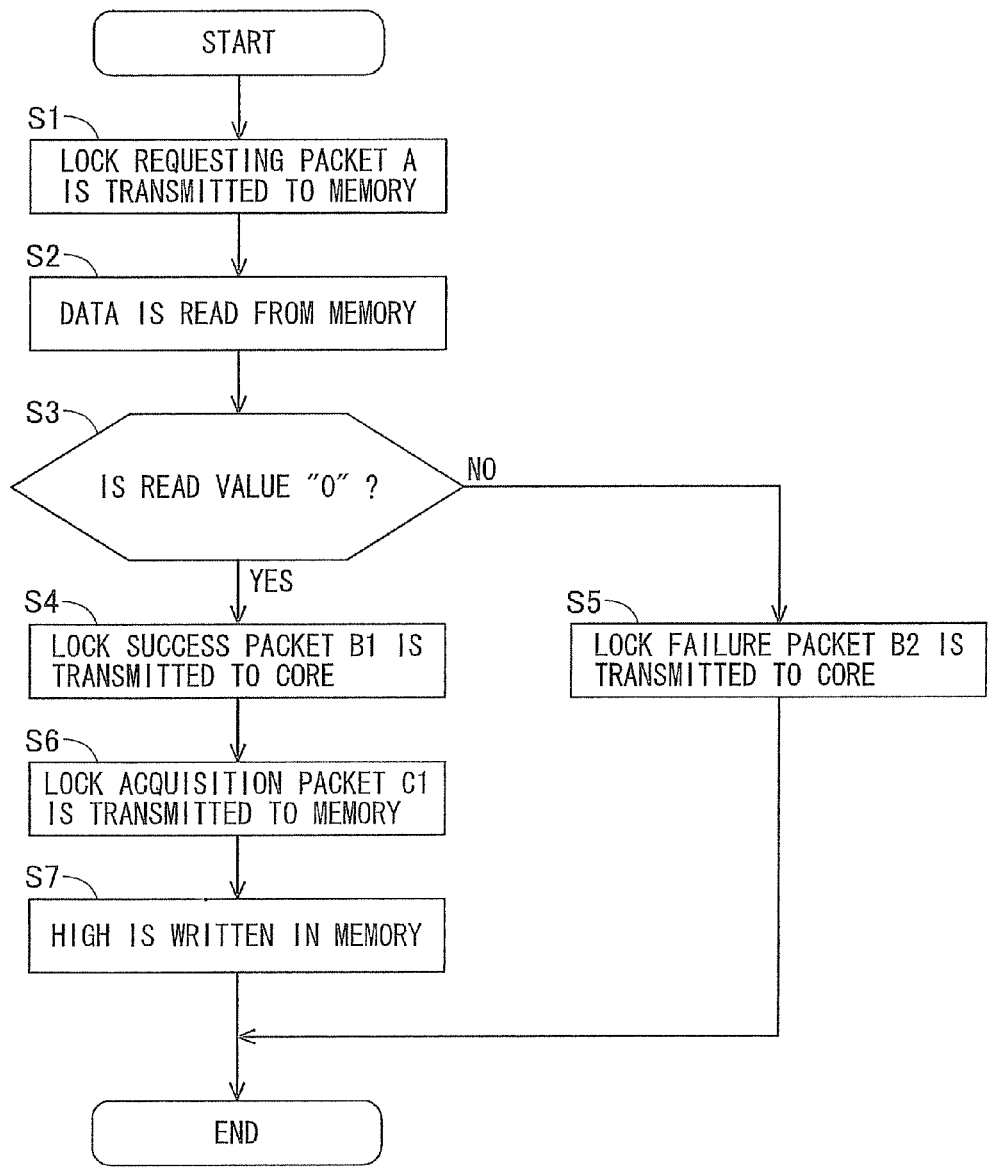
FIG. 2 is a flowchart showing the steps for performing the Test & Set access.

In the first embodiment, the lock is acquired by performing a Test & Set access as will be shown in the following example. FIG. 2 is a flowchart showing the steps for performing the Test & Set access. As an example, the steps will be explained where the core C11 acquires a lock to the data on the memory M12.

Firstly, the core C11 transmits a packet for requesting a lock to the data on the memory M12 (hereinafter referred to as lock requesting packet "A") to the memory M12 (S1). When the lock requesting packet "A" is received by the memory M12, the value written in the lock control address 0x4000_0000 of the memory M12 is read (S2). Then, a packet including the read value is transmitted from the memory M12 to the core C11, which is a transmission source of the lock requesting packet "A".

Here, when the value read from the memory M12 is set to be low (YES at S3), the memory M12 can be accessed, while when the value is set to be high (NO at S3), the memory M12 cannot be accessed. That is, the memory M12 transmits, to the core C11, one of a packet showing that the read value is set to be low (hereinafter referred to as lock success packet "B1") (S4) and a packet showing that the read value is set to be high (hereinafter referred to as lock failure packet "B2") (S5).

The core C11 determines that the core C11 has succeeded in acquiring the lock when receiving the lock success packet "B1". Then, the core C11 transmits, to the memory M12, a packet for writing high in the lock control address 0x4000_0000 of the memory M12 (hereinafter referred to as lock acquisition packet "C1") in order to forbid the other cores C12 to C14 to access the memory M12 (S6). Then, the value written in the lock control address 0x4000_0000 of the memory M12 (S7) is set to be high, and the other cores C12 to C14 cannot access the data writing area 0x5000_0000 to 0x5000_FFFF on the memory M12.

On the other hand, the core C11 determines that the core C11 has failed in acquiring the lock when receiving the lock failure packet "B2". In this case, the core C11 cannot access the data writing area 0x5000_0000 to 0x5000_FFFF on the memory M12.

When releasing the lock, the core C11 transmits, to the memory M12, a packet for writing low in the lock control address 0x4000_0000 of the memory M12 (hereinafter referred to as lock releasing packet "C2"). Thus, the value of low is written in the lock control address of the memory M12, and each of the cores C11 to C14 can access the data writing area 0x5000_0000 to 0x5000_FFFF on the memory M12.

As explained above, in the first embodiment, at least the following five kinds of packets are transferred between the core and the memory. The packets transferred from the core to the memory are: the lock requesting packet "A" (fifth data) for acquiring the lock (exclusive access right); the lock acquisition packet "C1" (first data) indicating that the lock to the data on the memory has been acquired; and the lock releasing packet "C2" (third data) for releasing the lock to the data on the memory. The packets transferred from the memory to the core are: the lock success packet "B1" (second data) indicating that the core can access the memory; and the lock failure packet "B2" (fourth data) indicating that the core cannot access the memory.

When the core tries to acquire the lock to the data on the memory and fails therein, the core cannot perform any further process. That is, it is useless to transfer the data of the lock requesting packet "A" and the lock failure packet "B2" when the lock cannot be acquired. The performance of the entire system is deteriorated when the useless data transfer is frequently performed and obstructs another data transfer.

Accordingly, the first embodiment is intended to reduce the useless data transfers by determining whether or not the lock can be acquired based on the information written in each router arranged between the core and the memory.

Figures 3, 4:
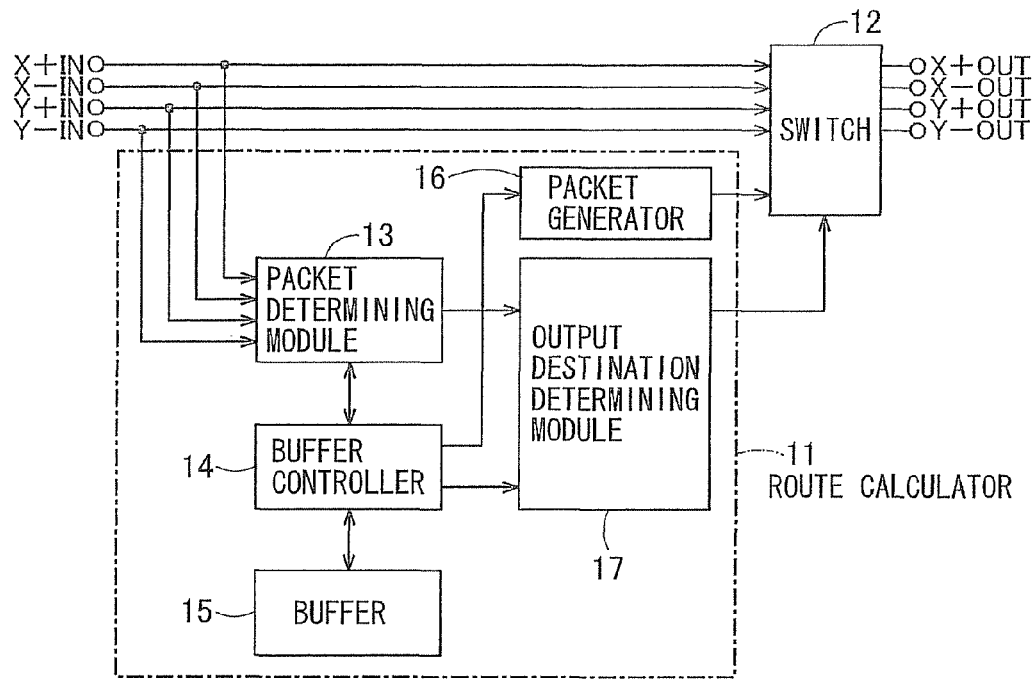
FIG. 3 is a schematic block diagram showing an example of the internal configuration of the router.
FIG. 4 is a configuration diagram showing an example of the configuration of the buffer 15.

FIG. 3 is a schematic block diagram showing an example of the internal configuration of the router. The router shown in FIG. 3 sets routes in four directions. Note that only three input/output routes are set in the router located at the left end or the right end. The internal configuration of the routers R11 to R24 are similar to each other, and thus the following explanation will be made on the router R12 as a representative.

Each of input terminals X+IN, X−IN, Y+IN, and Y−IN of the router R12 is connected to the core, router, or memory located in the X+ direction (right), X− direction (left), Y+ direction (lower), or Y− direction (upper). In the case of the router R12, the input terminal X+IN is connected to the router R13, the input terminal X−IN is connected to the router R11, the input terminal Y+IN is connected to the router R22, and the input terminal Y−IN is connected to the core C12. A similar explanation can be applied to output terminals X+OUT, X−OUT, Y+OUT, and Y−OUT of the router R12.

The router R12 has a route calculator 11 and a switch 12. The route calculator 11 calculates which one of the output terminals X+OUT to Y−OUT the packet inputted from one of the input terminals X+IN to Y−IN should be outputted. The switch 12 switches the output destination of the packet in accordance with the calculation result of the route calculator 11.

The route calculator 11 has: a packet determining module (data determining module) 13; a buffer controller 14; a buffer (storage) 15; a packet generator (data generator) 16; and an output destination determining module 17. The packet determining module 13 determines whether the inputted packet is the packet "A", "B1", "B2", C1, or C2. The buffer controller 14 refers to the information of the buffer 15, and writes data in the buffer 15 and clears data thereon. The packet generator 16 generates a packet based on the determination result on the inputted packet. The output destination determining module 17 determines the output destination of the packet depending on the kind of the packet and the information of the buffer 15. An output module, which has the packet generator 16 and the output destination determining module 17, outputs the generated packet and output destination to the switch 12.

FIG. 4 is a configuration diagram showing an example of the configuration of the buffer 15. In the buffer 15 of the first embodiment, each entry (item) has a Valid bit (V) field and an address field. For example, when (V) is set to be high, its entry is valid, while when (V) is set to be low, its entry is invalid. The lock control address of each of the memories M11 to M14 is written in the address field. FIG. 4 shows an example where the buffer 15 has three entries, but the number of entries may not be limited thereto.

Figure 5:
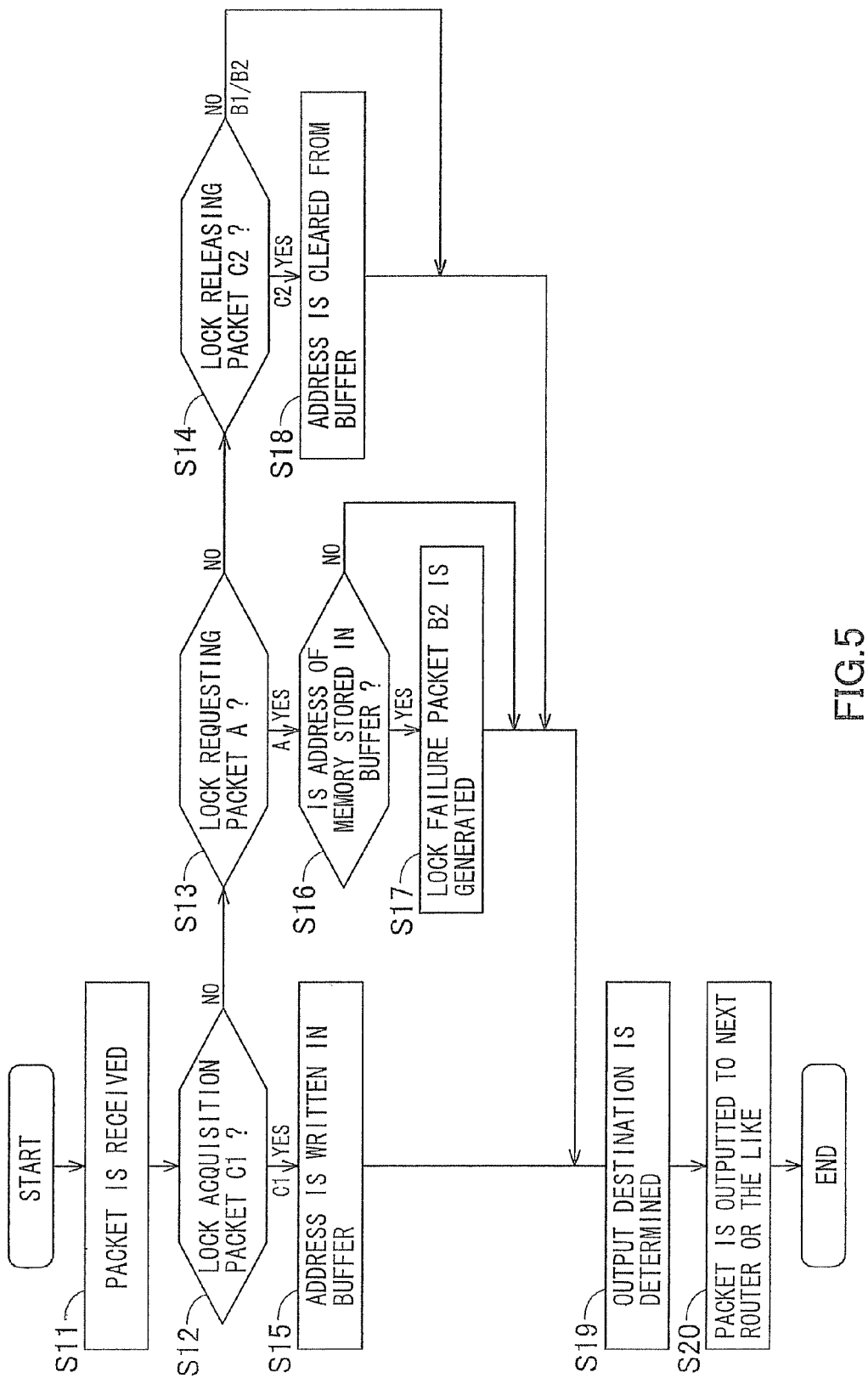
FIG. 5 is a flowchart showing an example of the processing operation performed by the router.

FIG. 5 is a flowchart showing an example of the processing operation performed by the router. When the router receives a packet (S11), the packet determining module 13 determines the kind of the packet (S12 to S14), and performs the following processes depending on the kind of the packet.

When the received packet is the lock acquisition packet "C1" (YES at S12), the buffer controller 14 writes, in the address field of an entry whose (V) is set to be low, the lock control address of the memory, which is the transmission source of the lock acquisition packet "C1", and sets (V) to be high (S15). Then, the output destination determining module 17 determines the output destination of the lock acquisition packet "C1" (S19), and the switch 12 switches the output destination of the lock acquisition packet "C1" to the next router or core determined by the output destination determining module 17 (S20).

When the received packet is the lock requesting packet "A" (YES at S13), the buffer controller 14 confirms whether or not the lock control address of the memory, which is the transmission destination of the lock requesting packet "A", is written in the buffer 15 (S16). If not written (NO at S16), the output destination determining module 17 determines the output destination of the lock requesting packet "A" (S19), and the switch 12 switches the output destination of the lock requesting packet "A" to the next router or memory determined by the output destination determining module 17 (S20). If written (YES at S16), the packet generator 16 generates the lock failure packet "B2" to be transmitted to the core, which is the transmission source of the lock requesting packet "A" (S17). Then, the output destination determining module 17 determines the output destination of the lock failure packet "B2" (S19), and the switch 12 switches the output destination of the lock failure packet "B2" to the next router or core determined by the output destination determining module 17 (S20).

As stated above, when the lock control address of the memory, which is the transmission destination of the lock requesting packet "A", is written in the buffer 15, the lock requesting packet "A" is not outputted to the next router and the memory, and the lock failure packet "B2" is generated to be transmitted back to the core, which is the transmission source of the lock requesting packet "A". Accordingly, whether or not the lock can be acquired can be determined without transmitting the lock requesting packet "A" up to the memory, thereby reducing the data transfer amount.

When the received packet is the lock releasing packet "C2" (YES at S14), the buffer controller 14 clears, from the buffer 15, the lock control address of the memory, which is the transmission destination of the lock releasing packet "C2", and sets (V) to be low (S18). Then, the output destination determining module 17 determines the output destination of the lock releasing packet "C2" (S19), and the switch 12 switches the output destination of the lock releasing packet "C2" to the next router or core determined by the output destination determining module 17 (S20).

When the received packet is another packet, namely the lock success packet "B1" or the lock failure packet "B2" (NO at S14), the output destination determining module 17 determines the output destination of the received packet (S19), and the switch 12 switches the output destination of the received packet to the next router, core, or memory determined by the output destination determining module 17 (S20).

Figures 6, 7:
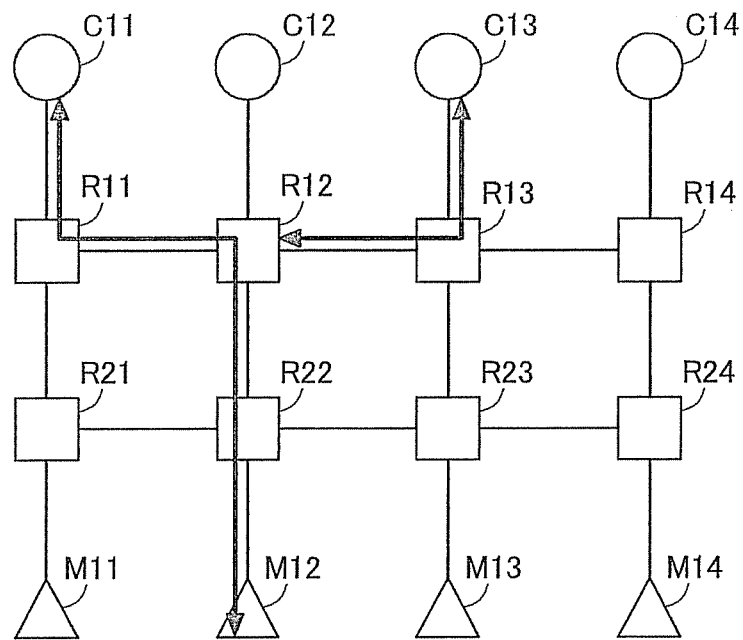
FIG. 6 is a diagram showing an example of the data transfer in the data transfer system.
FIG. 7 is an example of the setting of the buffer 15 of the first embodiment.

A specific example of the processing operation performed by the data transfer system will be explained referring to FIG. 5 and FIG. 6. FIG. 6 is an example where the core C13 tries to acquire the lock to the memory M12 after the core C11 has successfully acquired the lock to the memory M12.

Note that the data transfer system in the first embodiment operates in a fixed route type where the packet is transferred between the core and the memory through a predetermined route. For example, the packet transferred from the core C11 to the memory M12 (or from the memory M12 to the core C11) passes through the routers R11, R12, and R22, while the packet transferred from the core C13 to the memory M12 (or from the memory M12 to the core C13) passes through the routers R13, R12, and R22.

Firstly, the core C11 transmits the lock requesting packet "A" (S1 of FIG. 2), and the lock requesting packet "A" is received by the router R11 first. The lock control address 0x4000_0000 of the memory M12 is not written in the buffer 15 of the router R11 (NO at S16). Therefore, the router R11 outputs the received lock requesting packet "A" to the router R12.

After that, the lock requesting packet "A" is received by the router R12. The router R12 operates similarly to the router R11, and the router R12 outputs the lock requesting packet "A" to the router R22. The router R22 operates similarly to the router R11, and the router R22 outputs the received lock requesting packet "A" to the memory M12.

After that, the value written in the lock control address of the memory M12 is read (S2 of FIG. 2), and the lock success packet "B1" is transmitted to the core C11 (YES at S3 and S4).

The lock success packet "B1" transmitted from the memory M12 is received by the core C11 through the routers R22, R12, and R11. When the core C11 receives the lock success packet "B1", the core C11 determines that the core C11 has succeeded in acquiring the lock, and transmits the lock acquisition packet "C1" to the memory M12 (S6 of FIG. 2).

The lock acquisition packet "C1" transmitted from the core C11 is received by the router R11 first. When the router R11 receives the lock acquisition packet "C1" (S11 and YES at S12 in FIG. 5), the buffer controller 14 writes the lock control address 0x4000_0000 of the memory M12 in the buffer 15, and sets (V) to be high (S15). Accordingly, the buffer 15 of the router R11 is set as shown in FIG. 7. Then, the router R11 outputs the lock acquisition packet "C1" to the router R12 (S19 and S20).

After that, each of the routers R12 and R22 operates similarly to the router R11. The buffer 15 of each of the routers R12 and R22 is set also as shown in FIG. 7.

The lock acquisition packet "C1" outputted from the router R22 is received by the memory M12. Then, the value of high is written in the lock control address of the memory M12 (S7 of FIG. 2). In this way, the core C11 acquires the lock. In the first embodiment, after the core receives the lock success packet "B1" from the memory, each router on the route writes information in the buffer 15 when transferring the lock acquisition packet.

Suppose a case where the core C13 tries to acquire the lock to the data on the memory M12 in a state where the core C11 has the lock. The core C13 transmits the lock requesting packet "A". The lock requesting packet "A" is received by the router R13 first. The lock control address 0x4000_0000 of the memory M12 is not written in the buffer 15 of the router R13 (NO at S16). Therefore, the router R13 outputs the received lock requesting packet "A" to the router R12 (S19 and S20).

After that, the router R12 receives the lock requesting packet "A" (S11 and YES at S13). Here, as shown in FIG. 7, the lock control address 0x4000_0000 of the memory M12 is written in the buffer 15 of the router R12 (YES at S16). This means that the data on the memory M12 is already locked, and thus the core C13, which is the transmission source of the lock requesting packet, cannot acquire the lock to the data on the memory M12.

Therefore, the router R12 does not output the lock requesting packet "A". Instead, the packet generator 16 of the router R12 generates the lock failure packet "B2", and transmits it to the core C13.

When the router R13 receives the lock failure packet "B2" (S11 and NO at S14), the router R13 outputs the lock failure packet "B2" to the core C13. Accordingly, the core C13 receives the lock failure packet "B2", and determines that the core C13 has failed in acquiring the lock.

In the first embodiment, the lock requesting packet "A" is transmitted from the core C13 toward the memory M12, but the lock requesting packet "A" is transmitted up to the router R12 based on the information written in the buffer 15 of the router R12. Further, the lock failure packet "B2" is generated not by the memory M12 but by the router R12, and is outputted to the core C13. Accordingly, transfers of the lock requesting packet "A" and the lock failure packet "B2" between the memory M12 and the router R12 can be reduced.

On the other hand, when releasing the lock, the router operates as follows. The core C11 transmits the lock releasing packet "C2" to the memory M12. The lock releasing packet "C2" is received by the router R11 first. When the router R11 receives the lock releasing packet "C2" (S11 and YES at S14), the router R11 clears the lock control address 0x4000_0000 of the memory M12 written in the buffer 15, and sets the (V) to be low (S18). Then, the router R11 outputs the lock releasing packet "C2" to the router R12 (S19 and S20).

After that, each of the routers R12 and R22 operates similarly to the router R11. In this way, the lock control address 0x4000_0000 of the memory M12 written in the buffer 15 of each of the routers R11, R12, and R22 is cleared. When the lock releasing packet "C2" is received by the memory M12, the value of low is written in the lock control address 0x4000_0000. Accordingly, every one of the cores C11 to C14 can access the memory M12.

As stated above, in the first embodiment, the buffer is arranged in the router, and the lock control address of the memory whose lock is established is written in the buffer 15 of the router on the route. When the router receives the lock requesting packet "A" to the memory whose lock control address is written in the buffer 15, the router stops transferring the lock requesting packet "A", and generates the lock failure packet "B2" to transmit it to the transmission source of the lock requesting packet "A" is transmitted. Therefore, useless data transfers performed when the lock cannot be acquired can be restrained, and the process efficiency of the entire system can be improved.

(Second Embodiment)

The data transfer system of the first embodiment operates in a fixed route type where the packet is always transmitted through a fixed route. On the other hand, the data transfer system of a second embodiment operates in a variable route type where the route is adaptively determined depending on data transfer situations.

Figures 8, 9:
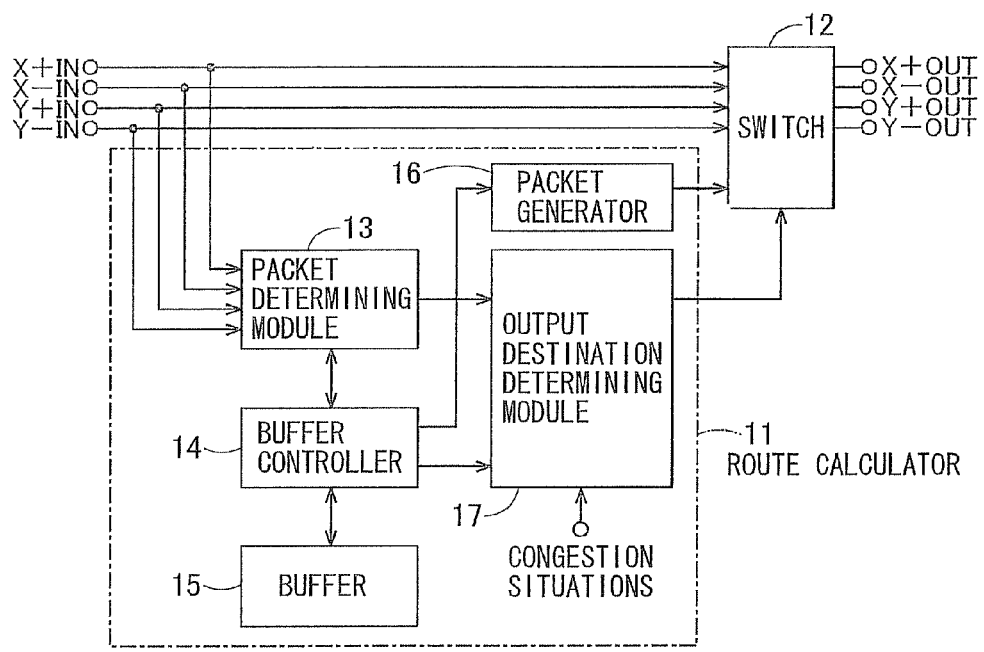
FIG. 8 is a schematic block diagram showing an example of the internal configuration of a router according to the second embodiment.
FIG. 9 is a configuration diagram showing an example of the configuration of the buffer 15 of the router in the second embodiment.

FIG. 8 is a schematic block diagram showing an example of the internal configuration of a router according to the second embodiment. In FIG. 8, components common to those of FIG. 3 have common reference numerals, respectively, and the differences will be mainly explained hereinafter. The output destination determining module 17 of the router is inputted with congestion situations of its surrounding routers, namely data transfer amounts. Accordingly, the output destination determining module 17 can output the packet selecting a route which is not congested and has a small data transfer amount, thereby improving transfer speed. Further, the output destination determining module 17 transmits the determined route information to the buffer controller 14.

FIG. 9 is a configuration diagram showing an example of the configuration of the buffer 15 of the router in the second embodiment. Comparing to the buffer 15 of FIG. 4, the buffer 15 of FIG. 9 further has a field to write the output destination of the lock acquisition packet "C1". Written in this output destination field is one of X+, X−, Y+, and Y−, indicative of the route to which the lock acquisition packet "C1" is outputted. Note that each of X+, X−, Y+, and Y− can be replaced by a 2-bit digital signal. For example, X+, X−, Y+, and Y− may be replaced by "00," "01," "10," and "11," respectively.

Figure 10:
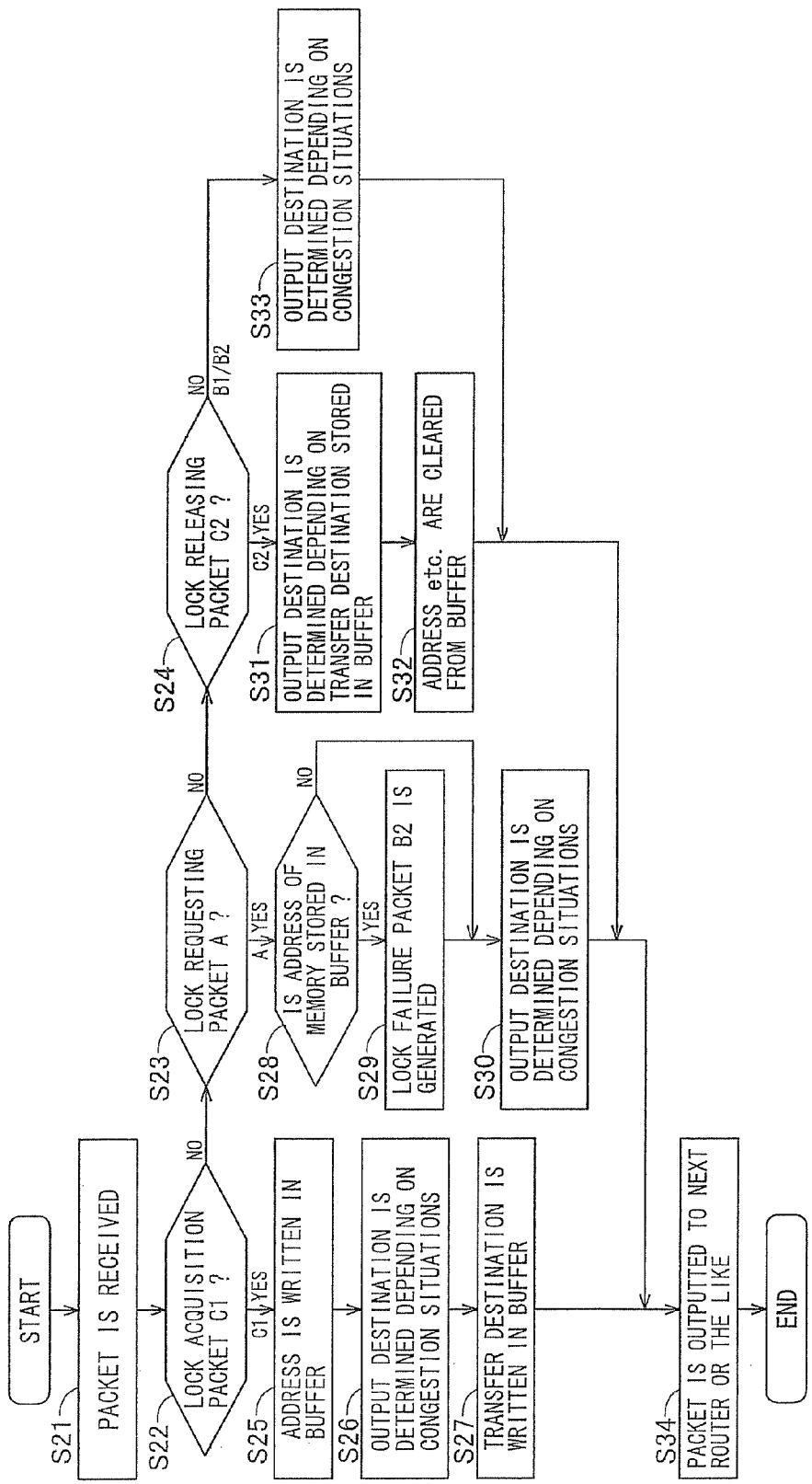
FIG. 10 is a flowchart showing an example of the processing operation performed by the router in the second embodiment.

FIG. 10 is a flowchart showing an example of the processing operation performed by the router in the second embodiment.

When the received packet is the lock acquisition packet "C1" (YES at S22), the buffer controller 14 of the router writes, in the address field of an entry whose (V) is set to be low, the lock control address of the memory, which is the transmission source of the lock acquisition packet "C1", and sets (V) to be high (S25). Then, the output destination determining module 17 determines the output destination of the lock acquisition packet "C1" depending on congestion situations (S26). At this time, the buffer controller 14 writes, in the buffer 15, the output destination of the lock acquisition packet "C1" outputted from the output destination determining module 17 (S27). Then, the router switches the output destination of the lock acquisition packet "C1" to the next router or core determined by the output destination determining module 17 (S34).

When the received router is the lock requesting packet "A" (YES at S23), the lock success packet "B1" or the lock failure packet "B2" (NO at S24), the output destination of the packet is determined depending on congestion situations (S30 and S33), which is the only difference from the first embodiment.

When the received packet is the lock releasing packet "C2" (YES at S24) and the lock control address of the memory, which is the transmission destination of the lock releasing packet "C2", is written in the buffer 15, the output destination determining module 17 determines the output destination of the lock releasing packet "C2" in accordance with the output destination information written in the buffer 15 (S31). Then, the buffer controller 14 clears a corresponding entry from the buffer 15 (S32). After that, the router switches the output destination of the lock releasing packet "C2" to the next router or core determined by the output destination determining module 17 (S34).

Figure 11:
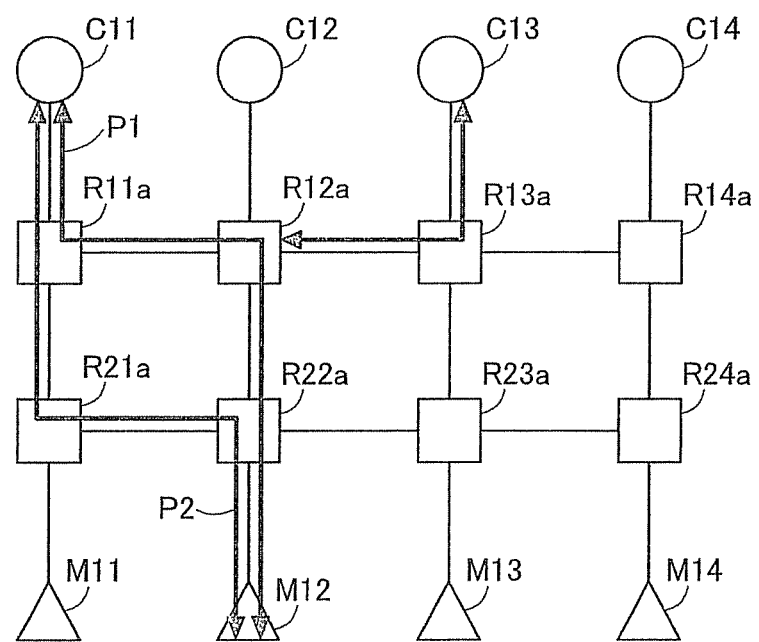
FIG. 11 is a diagram showing an example of the data transfer in the data transfer system.

Hereinafter, a specific example of the processing operation performed by the data transfer system will be explained referring to FIG. 10 and FIG. 11. FIG. 11 is a diagram showing an example of the data transfer in the data transfer system. Since the data transfer system of the second embodiment operates in a variable route type, when transferring the packet from the core C11 to the memory M12 (or from the memory M12 to the core C11), for example, a route P1 connecting routers R11a, R12a, and R22a or a route P2 connecting routers R11a, R21a, and R22a is selected depending on congestion situations of other routers.

Similarly to the first embodiment, firstly, the core C11 transmits the lock requesting packet "A" to the memory M12, and then the core C11 receives the lock success packet "B1" from the memory M12. These packets may be transferred through either the route P1 or P2 depending on congestion situations.

Secondly, when the core C11 has acquired the lock success packet "B1", the core C11 transmits the lock acquisition packet "C1" to the memory M12. The core C11 transmits the lock acquisition packet "C1" to the router R11a first. When receiving the lock acquisition packet "C1" (S21 and YES at S22), the router R11a writes the lock control address 0x4000_0000 of the memory M12 in the buffer 15, and sets (V) to be high (S25).

Further, the output destination determining module 17 determines whether the lock acquisition packet "C1" should be outputted to the router R12a or the router R21a depending on congestion situations (S26). More specifically, the output destination determining module 17 compares the data transfer amount of the router R12a with that of the router R21a to determine outputting the lock acquisition packet "C1" to a router having a smaller data transfer amount. In this case, the router R12a is assumed to be selected. The buffer controller 14 of the router R11a writes X+ in the output destination field of the buffer 15 (S27). Accordingly, the buffer 15 of the router R11a is set as shown in FIG. 12A. Then, the router R11a switches the output destination of the lock acquisition packet "C1" to the router R12a.

After that, the router R12a operates similarly to the router R11a. Since the router R12a outputs the lock acquisition packet "C1" to the router R22a (S26), Y+ is written in the buffer 15 (S27). Accordingly, the buffer 15 of the router R12a is set as shown in FIG. 12B. After that, the router R22a operates similarly to the router R11a, and the buffer 15 of the router R22a is set as shown in FIG. 12C.

Suppose a case where the core C13 tries to acquire the lock to the data on the memory M12 to transmit the lock requesting packet "A" in a state where the core C11 has the lock to the data on the memory M12. The lock control address 0x4000_0000 of the memory M12 is written in the buffer 15 of the router R12a (YES at S28). Therefore, when the lock requesting packet "A" transmitted from the core C13 is received by the router R12a, the lock requesting packet "A" is not further transferred, and the lock failure packet "B2" is generated (S29) and transmitted to the core C13 (S30 and S34). Accordingly, useless data transfers between the router R12a and the memory M12 can be restrained.

On the other hand, when releasing the lock, the router operates as follows. The core C11 transmits the lock releasing packet "C2" to the memory M12. When the router R11a receives the lock releasing packet "C2" (S21 and YES at S24), the router R11a switches the output destination of the lock releasing packet "C2" to the router R12a based on the information written in the buffer 15 (S31). Further, the buffer controller 14 clears the lock control address 0x4000_0000 of the memory M12 and the output destination X+ written in the buffer 15, and sets (V) to be low (S32). Then, the router R11a switches the output destination of the lock releasing packet "C2" to the router R12a.

After that, the router R12a operates similarly to the router R11a. The router R12a switches the output destination of the lock releasing packet "C2" to the router R21a based on the information written in the buffer (S31). Further, the buffer controller 14 clears a corresponding entry from the buffer 15 (S32). Then, the router R12a outputs the lock releasing packet "C2" from the output terminal Y+OUT (S34). The router R22a operates similarly to the router R11a, and corresponding information is cleared from the buffer 15.

In this way, the lock control address 0x4000_0000 written in the buffer 15 of each of the routers R11a, R12a, and R22a is cleared, and every one of the cores C11 to C14 can access the memory M12.

In the second embodiment, the output destination field is arranged in the buffer 15, and thus the lock acquisition packet "C1" and the lock releasing packet "C2" are inevitably transferred through the same route. Therefore, the lock releasing packet "C2" transferred through the same route surely clears the lock control address of the memory and so on written in the buffer 15 of each router on the route through which the lock acquisition packet "C1" was transferred.

As stated above, in the second embodiment, each of the packets excepting the lock releasing packet "C2" can be outputted and transferred selecting a route having a smaller data transfer amount depending on congestion situations, by which data can be transferred more efficiently. Further, the output destination of the lock acquisition packet "C1" is stored in the buffer 15 in the router. Since the lock releasing packet "C2" is transferred through the same route, the information written in the buffer 15 can be surely cleared. Further, useless data transfers can be restrained.

(Third Embodiment)

In addition to the configuration of the second embodiment, a third embodiment is intended to write the lock control address of the memory whose lock cannot be acquired in the buffer 15 of each router on the route through which the lock failure packet "B2" is transferred. Hereinafter, differences from the second embodiment will be mainly explained.

In the third embodiment, the internal structure of the router is similar to that of FIG. 8, but the structure of the buffer 15 is different. FIG. 13 is a configuration diagram showing an example of the configuration of the buffer 15 in the router. Comparing to the buffer 15 of FIG. 9, the buffer 15 of FIG. 13 further has a field to write the output destination of the lock failure packet "B2". More specifically, the buffer 15 has fields for output destinations X+, X−, Y+, and Y− respectively to write 1-bit values. The value of high is written in the field corresponding to the route to which the lock failure packet "B2" is outputted, while the value of low is written in the field corresponding to the route to which the lock failure packet "B2" is not outputted.

By writing, in the buffer 15, the route to which the lock failure packet "B2" is outputted, the lock control address written in the buffer 15 can be surely cleared after releasing the lock.

Figure 14:
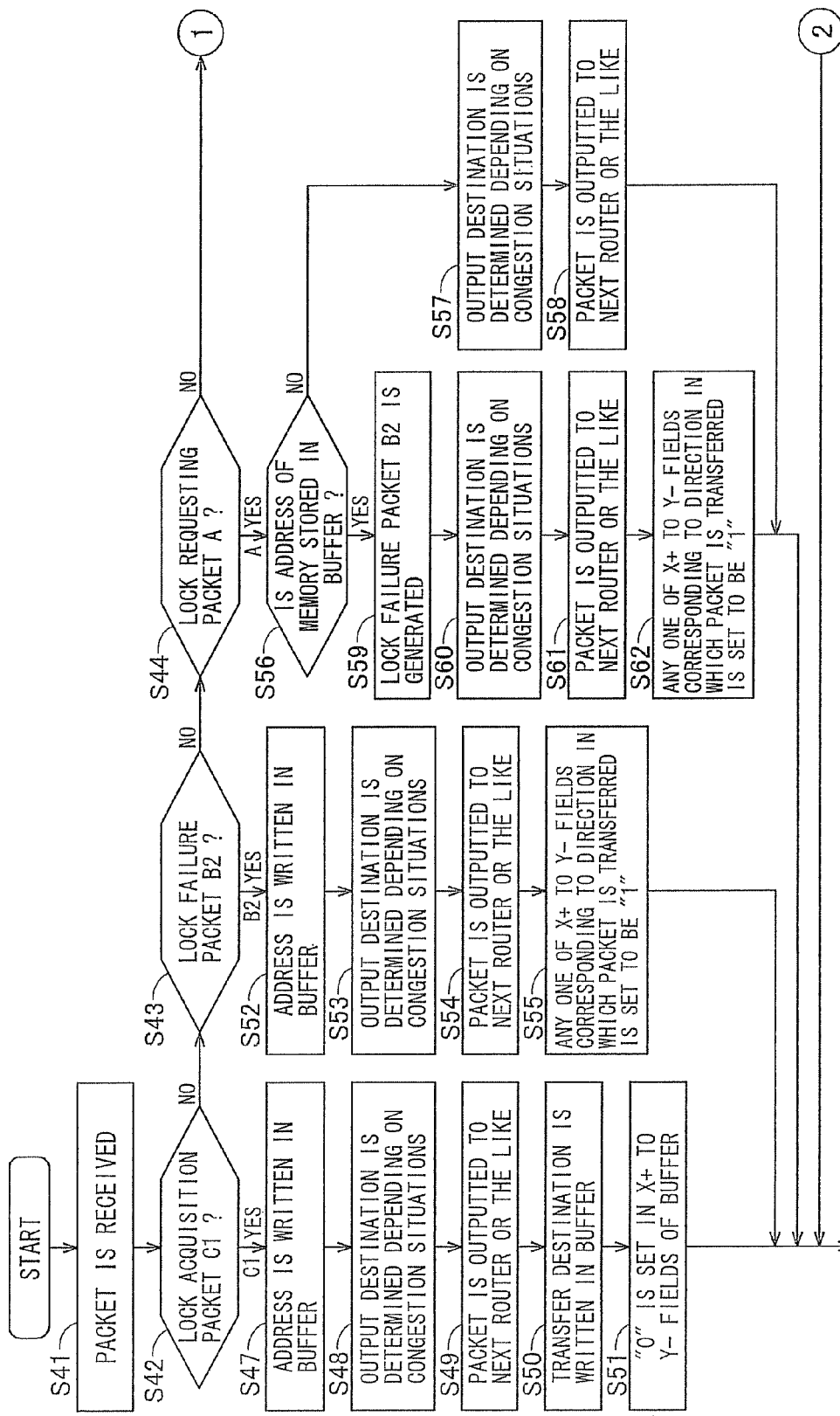
FIG. 14 is a flowchart showing an example of the processing operation performed by the router in the second embodiment.
Figure 15:
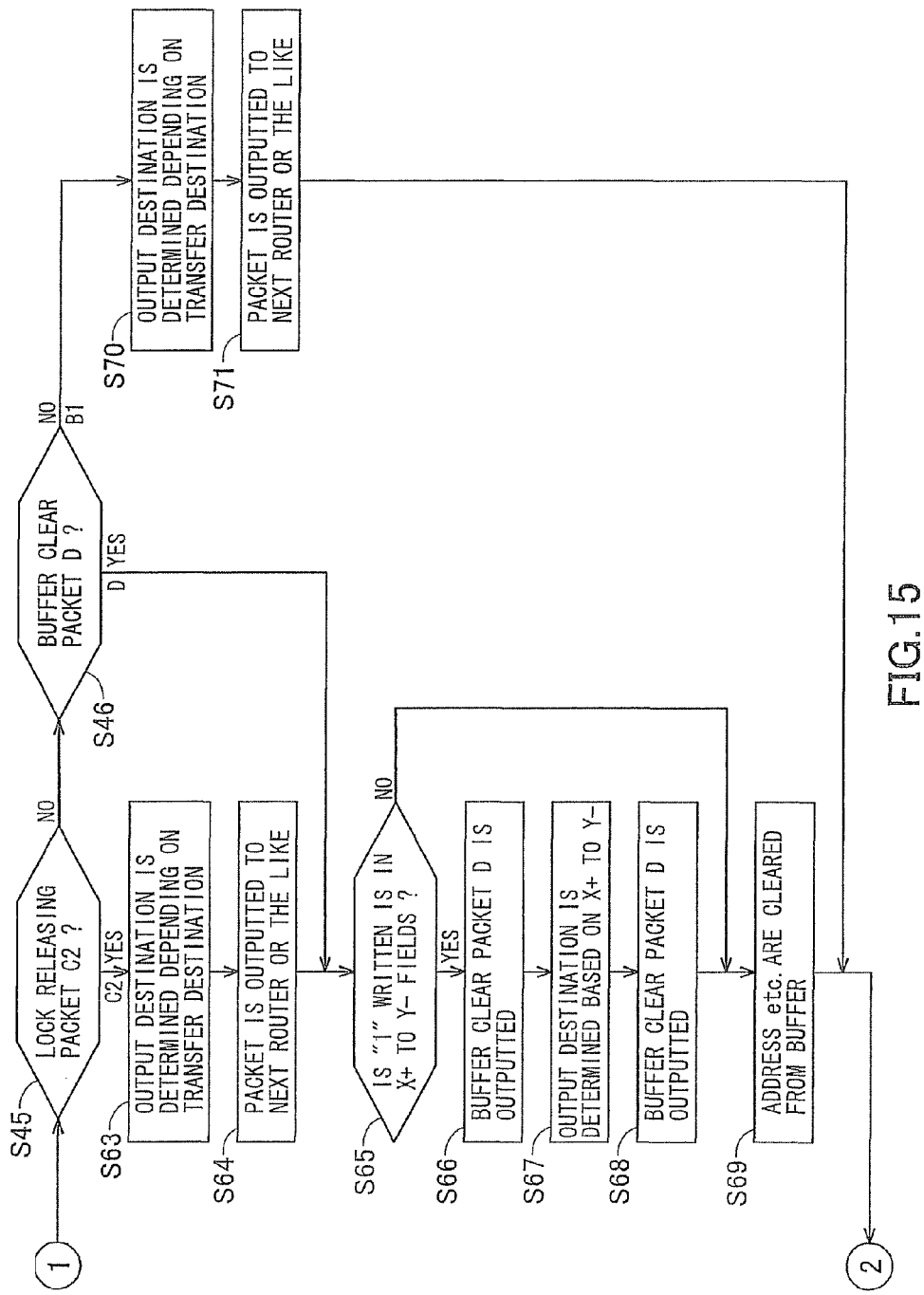
FIG. 15 is a flowchart showing an example of the processing operation performed by the router, following FIG. 14.

Each of FIG. 14 and FIG. 15 is a flowchart showing an example of the processing operation performed by the router of the third embodiment. The example shown in the third embodiment is based on a variable route type, but a fixed route type may be employed instead.

When the received packet is the lock acquisition packet "C1" (YES at S42), steps S47 to S50 are performed similar to the second embodiment, and then one of the corresponding output destination fields of the packet "B2" in the buffer 15 is set to be low (S51).

When the received packet is the lock failure packet "B2" (YES at S43), the router writes, in the buffer 15, the lock control address of the memory whose lock cannot be acquired (S52). Then, the router outputs the lock failure packet "B2" to the next router or the like depending on congestion situations (S53 and S54). Further, the buffer controller 14 sets high in one of the output destination fields of the packet "B2" in the buffer 15 corresponding to the output destination determined by the output destination determining module 17 (S55).

That is, in the third embodiment, the lock control address is set not only in the buffer 15 of the router through which the lock acquisition packet "C1" is transferred but also in the buffer 15 of the router through which the lock failure packet "B2" is transferred.

When the received packet is the lock requesting packet "A" (YES at S44) and the lock control address of the memory, which is the transmission destination of the lock requesting packet "A", is not written in the buffer (NO at S56), the router switches the output destination of the lock requesting packet "A" to the next router or the like depending on congestion situations (S57 and S58). When the lock control address is written in the buffer (YES at S56), the packet generator 16 generates the lock failure packet "B2" to be transmitted to the core, which is the transmission source of the lock requesting packet "A" (S59), and the router switches the output destination of the lock failure packet "B2" to the next router or the like to output it (S60 and S61). Further, the buffer controller 14 sets high in one of the packet "B2" output destination fields in the buffer 15 corresponding to the output destination determined by the output destination determining module 17 (S62).

When the received packet is the lock releasing packet "C2" (YES at S45), the router outputs the lock releasing packet "C2" to the next router or core in accordance with the lock control address and the output destination of the lock acquisition packet "C1" written in the buffer 15 (S63 and S64). After that, when the value of high is set in the output destination fields of the packet "B2" in the buffer 15 (YES at S65), the packet generator 16 newly generates a buffer clear packet "D" for clearing a corresponding entry from the buffer 15 in each of other routers (S66). Then, the router outputs the buffer clear packet "D" in every direction set to be high in the output destination fields of the packet "B2" (S67 and S68). After that, the buffer controller 14 clears a corresponding entry from the buffer 15 (S69).

As stated above, in the third embodiment, the buffer clear packet "D" (fifth data) is generated and outputted in addition to the five kinds of packets "A", "B1", "B2", C1, and C2 transferred in the first and second embodiments.

When the received packet is the buffer clear packet "D" (YES at S46), steps S65 to S69 are performed. When the received packet is the lock success packet "B1" (NO at S46), the router switches the output destination of the lock success packet "B1" to the next router or the like depending on congestion situations (S70 and S71).

Figures 16, 17:
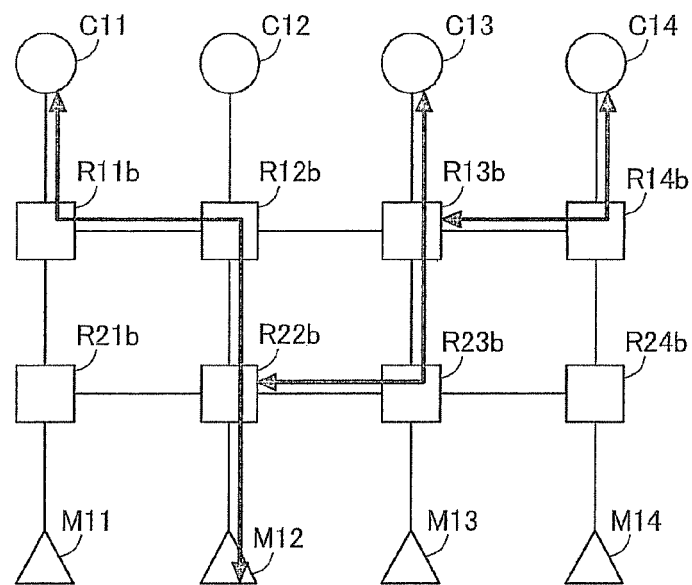
FIG. 16 is a diagram showing an example of the data transfer in the data transfer system.
FIG. 17 is an example of the setting of the buffer 15 in the router R22b.

Hereinafter, a specific example of the processing operation performed by the data transfer system will be explained referring to FIG. 14 to FIG. 16. FIG. 16 is a diagram showing an example of the data transfer in the data transfer system. Here, each of the cores C13 and C14 try to acquire the lock to the memory M12 after the core C11 has acquired the lock to the data on the memory M12.

First, the core C11 transmits the lock requesting packet "A" to the memory M12, and then the core C11 receives the lock success packet "B1" from the memory M12. These packets may be transferred through either a fixed route or a route determined depending on congestion situations.

Next, when the core C11 has acquired the lock success packet "B1", the core C11 transmits the lock acquisition packet "C1" to the memory M12. For example, when the lock acquisition packet "C1" is received by the memory M12 through routers R11b, R12b, and R22b, written in the buffer 15 of each of the routers are: the lock control address 0x4000_0000 of the memory M12 (S47); and the output destination of the lock acquisition packet "C1" (S48 to S50). Further, the value of low is set in all of the output destination fields of the packet "B2" in the buffer 15 (S51). Accordingly, the buffer 15 of the router R22b is set as shown in FIG. 17, for example.

Suppose a case where the core C13 tries to acquire the lock to the data on the memory M12 to transmit the lock requesting packet "A" in a state where the core C11 has the lock to the data on the memory M12. Here, the lock requesting packet "A" is received by the router R22b through the routers R13b and R23b. The lock control address 0x4000_0000 of the memory M12 is written in the buffer 15 of the router R22*b* (YES at S56). Therefore, the router R22*b* generates the lock failure packet "B2" (S59). Then, the router R22*b* outputs the lock failure packet "B2" to the router R23*b* (S60 and S61). Accordingly, the buffer controller 14 of the router R22*b* sets high in the output destination field X+ of the buffer 15 (S62 and FIG. 18A).

When receiving the lock failure packet "B2" (S41 and YES at S43), the router R23*b* writes the lock control address 0x4000_0000 of the memory M12 in the buffer 15 (S52). Further, the router R23*b* outputs the lock failure packet "B2" to the router R13*b* (S53 and S54). Accordingly, the value of high is set in the Y− field of the buffer 15 in the router R23*b* (S55 and FIG. 18(*b*)).

The router R13*b* performs operates similarly to the router R23*b*, and the buffer 15 of the router R13*b* is set as shown in FIG. 18C. The core C13 receives the lock failure packet "B2", and determines that the core C13 has failed in acquiring the lock.

Next, the core C14 tries to acquire the lock to the memory M12. The lock requesting packet "A" transmitted from the core C14 is received by the router R13*b* through a router R14*b*. The lock control address 0x4000_0000 of the memory M12 is written in the buffer 15 of the router R13*b* (YES at S56). Therefore, the router R13*b* generates the lock failure packet "B2" (S59). Then, the router R13*b* outputs the lock failure packet "B2" from the output terminal X+ OUT to the router R14*b* (S60 and S61). Accordingly, the buffer controller 14 sets high in the output destination field X+ of the buffer 15 (S62 and FIG. 19A).

When the router R14*b* receives the lock failure packet "B2" (S41 and YES at S43), the router R14*b* writes the lock control address 0x4000_0000 of the memory M12 in the buffer 15 (S52). Further, the router R14*b* outputs the lock failure packet "B2" from the output terminal Y−OUT to the core C14 (S53 and S54). Accordingly, the value of high is set in the output destination field Y− of the buffer 15 of the router R14*b* (S55 and FIG. 19B). The core C14 receives the lock failure packet "B2", and determines that the core C14 has failed in acquiring the lock.

The lock control address of the memory whose lock cannot be acquired is written not only in the router through which the lock acquisition packet "C1" is transferred but also in the router through which the lock failure packet "B2" is transferred. Therefore, the lock requesting packet "A" transmitted from the core is not transferred to the router and memory ahead of the router in which the lock control address of the memory is written. Accordingly, useless data transfers between the router and the memory can be reduced.

On the other hand, when releasing the lock, the router operates as follows. The core C11 transmits the lock releasing packet "C2" to the memory M12. The lock releasing packet "C2" is transferred to the routers R11*b*, R12*b*, and R22*b* in this order in accordance with the output destination of the lock acquisition packet "C1" written in the buffer 15 of each router. Each of the routers R11*b* and R12*b* operates similar to the second embodiment since the value of high is not set in any of the X+ to Y− fields of the buffer 15 therein (NO at S65).

When the router R22*b* receives the lock releasing packet "C2" (S41 and YES at S45), the router R22*b* outputs the lock releasing packet "C2" from the output terminal Y+OUT to the memory M12 in accordance with the output destination of the lock acquisition packet "C1" written in the buffer (S63 and S64). Here, because the value of high is set in the "B2" output destination field X+ of the router R22*b* (YES at S65), the router R22*b* generates the buffer clear packet "D" (S66) and outputs the buffer clear packet "D" from the output terminal X+OUT to the router R23*b* (S67 and S68). Then, the router R22*b* clears the output destination field of the packet "B2" of the buffer 15 (S69).

When the router R23*b* receives the buffer clear packet "D" (S41 and YES at S46), the router R23*b* outputs the buffer clear packet "D" to the router R13*b* depending on the buffer 15 (S65 to S67), and clears a corresponding entry from the buffer 15 (S68).

When the router R13*b* receives the buffer clear packet "D" (S41 and YES at S46), the router R13*b* operates similarly to the router R23*b*. That is, the buffer clear packet "D" is outputted from the output terminal X+OUT and the output terminal Y−OUT depending on the buffer 15 (S66 to S68), and a corresponding entry is cleared from the buffer 15 (S69).

The core C13, which is located in the position (Y−) above the router R13*b*, disregards the buffer clear packet "D" outputted from the output terminal Y−OUT. On the other hand, the buffer clear packet "D" outputted from the output terminal X+OUT is received by the router R14*b*. The router R14*b* operates similarly to the router R23*b*, and clears a corresponding entry from the buffer 15.

In this way, a corresponding entry can be cleared not only from the buffer 15 of the router through which the lock acquisition packet "C1" is transferred, but also from the buffer 15 of the router through which the lock failure packet "B2" is transferred and in which the lock control address of the memory is written.

As stated above, in the third embodiment, the lock control address of the memory whose lock cannot be acquired is written also in the router through which the lock failure packet "B2" is transferred. Therefore, when the packet from another core is received by the router in which the lock failure packet "B2" concerning the corresponding memory is written, the packet is not further transferred and thus useless data transfers can be reduced. Further, since the route of the lock failure packet "B2" is stored in the buffer 15 of the router, transmitting the buffer clear packet "D" to the route makes it possible to surely clear the corresponding entry from the buffer 15 of the router through which the lock failure packet "B2" is transferred.

(Fourth Embodiment)

In the second and third embodiments, the output destination of the lock acquisition packet "C1" is written in the buffer 15 and the lock acquisition packet "C1" and the lock releasing packet "C2" are transferred through the same route so that the address of the memory written in the buffer 15 is cleared when releasing the lock. On the other hand, in a fourth embodiment, a counter is arranged in the buffer 15 to clear the address of the memory.

In the fourth embodiment, the internal configuration of the router is similar to that of FIG. 8, but the configuration of the buffer 15 is different. FIG. 20 is a configuration diagram showing an example of the configuration of the buffer 15 in the router. The buffer 15 of FIG. 20 further has a counter. The counter is set to be a predetermined value as soon as the router receives the lock acquisition packet "C1" and the lock control address of the memory, which is the transmission destination of the lock acquisition packet "C1", is written in the buffer 15.

Figure 21:
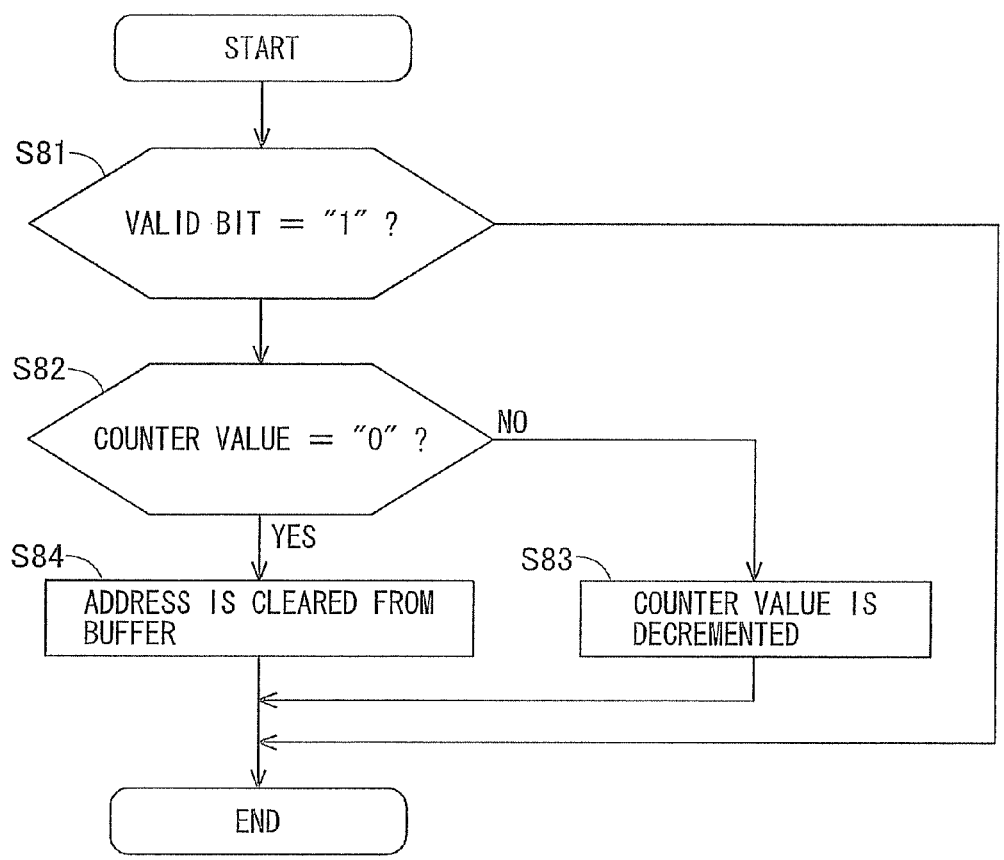
FIG. 21 is a flowchart showing an example of the counter control performed by the buffer controller 14.

FIG. 21 is a flowchart showing an example of the counter control performed by the buffer controller 14. A clock signal (not shown) is inputted into the buffer controller 14, and the processing operation shown in FIG. 21 is performed in synchronization with a rising edge of the clock signal, for example. When (V)="1" (YES at S81) and the count value is not "0" (NO at S82) in an entry, the buffer controller 14 decrements the count value by "1" (S83). On the other hand, when the count value is "0" (YES at S82), the buffer controller 14 clears the lock control address of the memory written in the buffer 15, and sets (V) to be "0" (S84). In the fourth embodiment, the buffer controller functions also as a count value controller.

As stated above, once the count value is set, the count value is automatically decremented as time passes, and a corresponding entry is cleared from the buffer 15 when the count value reaches "0".

FIG. 22 is a flowchart showing an example of the processing operation performed by the router. The example shown in the fourth embodiment is based on a variable route type, but a fixed route type may be employed instead.

Hereinafter, differences from the second embodiment will be mainly explained.

When the received packet is the lock acquisition packet "C1" (YES at S92), the buffer controller 14 writes, in the address field, the lock control address of the memory, which is the transmission source of the lock acquisition packet "C1", and sets (V) to be high (S95).

Here, the core C11 estimates the time (the number of clocks) during which the lock is established, and generates the lock acquisition packet "C1" including the estimated time information. There are various techniques to estimate the time during which the lock is established. For example, the estimated time may be the time previously determined depending on the core, or the time during which the lock in the previous access was established by the core C11. The router sets this estimated time in the buffer as the count value (S96).

After that, the router outputs the lock acquisition packet "C1" to the next router or the like depending on congestion situations (S101 and S102). The count value set in the buffer 15 of each router is decremented in accordance with the process of FIG. 21, and a corresponding entry is cleared from the buffer 15 when the count value reaches "0". Note that the fourth embodiment is different from the second and third embodiments in that the output destination of the lock acquisition packet "C1" is not stored.

When the received packet is the lock requesting packet "A" (YES at S93) and when the received packet is the lock success packet "B1" or the lock failure packet "B2" (NO at S94), steps similar to those in the second embodiment are performed.

When the received packet is the lock releasing packet "C2" (YES at S94) and the lock control address of the memory to which the lock releasing packet "C2" is transmitted is written in the buffer 15 (YES at S99), the buffer controller 14 clears the lock control address (S100). Then, the router outputs the lock releasing packet "C2" to the next router or the like depending on congestion situations (S101 and S102). In the fourth embodiment, the route of the lock releasing packet "C2" is not necessarily the same as that of the lock acquisition packet "C1", and the route is selected depending on congestion situations.

Figures 23, 24A, 24B:
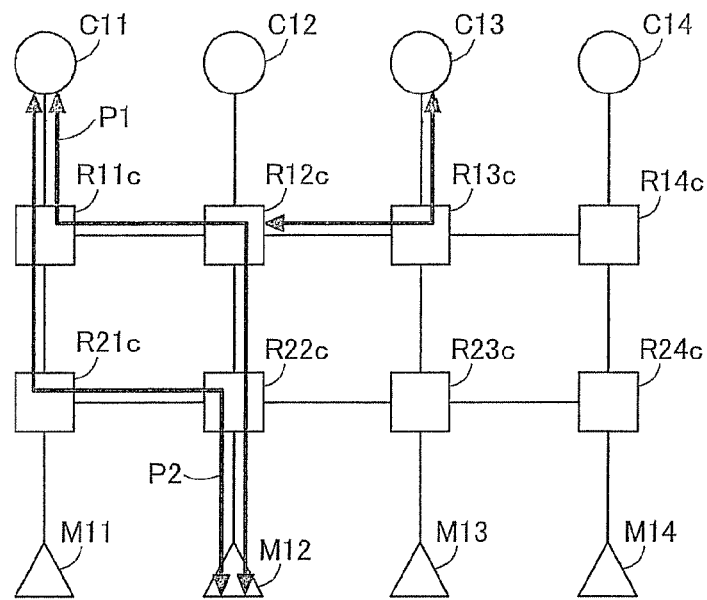
FIG. 23 is a diagram showing an example of the data transfer in the data transfer system.
FIG. 24A is an example of the setting of the buffer 15 in the router R11c of the fourth embodiment.
FIG. 24B is an example of the setting of the buffer 15 in the router R12c of the fourth embodiment.

Hereinafter, the processing operation of the data transfer system will be explained referring to FIG. 22 and FIG. 23. FIG. 23 is a diagram showing an example of how the data transfer is performed in the data transfer system.

Firstly, the core C11 has successfully acquired the lock to the data on the memory M12. These packets may be transferred through either the route P1 or P2 depending on congestion situations. The core C11 transmits the lock acquisition packet "C1" to the memory M12. This lock acquisition packet "C1" includes information of the estimated time during which the core C11 establishes the lock.

When the router R11c receives the lock acquisition packet "C1" (S91 and YES at S92), the router R11c writes the lock control address 0x4000_0000 of the memory M12 in the address field of the buffer 15 (S95), and sets the estimated time in the counter (S96). For example, when the estimated time is 0x1000, the buffer 15 of the router R11c is set as shown in FIG. 24A. After that, the router R11c outputs the lock acquisition packet "C1" from the output terminal X+OUT to the router R12c (S101 and S102).

The router R12c operates similarly to the router R11c. Here, the buffer controller 14 of the router R12c may simply set the estimated time 0x1000 in the counter field of the buffer, or may set in the counter an estimated value obtained by subtracting, from the estimated time, time for transferring the lock acquisition packet "C1" from the router R11c to the router R12c. The transfer time may be actual transfer time or a predetermined value. By setting a value considering the transfer time as the estimated time, estimation accuracy can be improved. For example, when the estimated time from which the transfer time is subtracted is 0x0F00, the buffer 15 of the router R12c is set as shown in FIG. 24B. After that, the router R12c outputs the lock acquisition packet "C1" from the output terminal Y+OUT to the router R22c.

The router R22c operates similarly to the router R11c, and the lock control address 0x4000_0000 of the memory M12 and the count value are set in the buffer 15. After that, the lock acquisition packet "C1" is received by the memory M12, and the value of high is set in the lock control address of the memory M12 so that the other cores C12 to C14 cannot access the memory M12.

The count value set in the buffer 15 of each of the routers R11c, R12c, and R22c is decremented with each clock in accordance with the control shown in FIG. 21, for example. When the count value reaches "0", the lock control address 0x4000_0000 of the memory M12 is cleared.

Here, suppose a case where the core C13 tries to acquire the lock to the data on the memory M12 to transmit the lock requesting packet "A" before the count value reaches "0". For example, the lock requesting packet "A" is received by the router R12c through the router R13c. Since the lock control address 0x4000_0000 of the memory M12 is written in the buffer 15 (YES at S97), the router R12c generates the lock lure packet "B2" (S98). Then, the router R12c transmits the generated lock failure packet "B2" to the router R13c (S101 and S102). Accordingly, useless data transfers between the router R12c and the memory M12 can be reduced.

When the estimated time is shorter than the actual time during which the lock is established, the lock control address 0x4000_0000 of the memory written in the router is cleared before the lock is released. In this case, the address 0x4000_0000 of the memory, which is the transmission destination of the packet, is not written in the router (NO at S97). Accordingly, the router does not generate the lock failure packet "B2", and thus the lock requesting packet "A" is received by the memory M12. Since the value of the lock control address of the memory M12 is set to be high while the core C11 establishes the lock to the data on the memory M12, the lock failure packet "B2" is transmitted from the memory M12 to the core C13. Therefore, although data transfers are generated between the router R12c and the memory M12, malfunction does not occur.

Next, the core C11 transmits the lock releasing packet "C2" to the memory M12 before the count value reaches "0". Since the lock control address 0x4000_0000 of the memory M12 is written in the buffer 15 (YES at S99), the router R11c clears the lock control address (S100).

After that, the router R11c determines the output destination of the lock releasing packet "C2" depending on congestion situations (S101). In the fourth embodiment, the lock releasing packet "C2" is not necessarily required to be transferred through the same route as that of the lock acquisition packet "C1". In the following, the lock releasing packet "C2" is assumed to be outputted from Y+OUT, which is different from the route of the lock acquisition packet "C1", to a router R21c (S102).

Since the lock control address 0x4000_0000 of the memory M12 is not written in the buffer 15 (NO at S99), the router R21c does not update the buffer 15. Then, the router R21c outputs the lock releasing packet "C2" from X+OUT to the router R22c (S101 and S102).

Since the lock control address 0x4000_0000 of the memory M12 is written in the buffer 15 (YES at S99), the router R21 clears the lock control address (S100). Then, the router R22c outputs the lock releasing packet "C2" from Y+OUT to the memory M12 (S101 and S102).

Then, the lock control address 0x40000_0000 of the memory M12 is set to be low. Accordingly, the lock to the data on the memory M12 is released, and every one of the cores C11 to C14 can access the memory M12.

Since the lock releasing packet "C2" is not transferred through the router R12c, the lock control address 0x4000_0000 written in the buffer 15 of the router R12c is not cleared by the lock releasing packet. However, since the buffer controller 14 controls the counter, the address written in the buffer 15 is automatically cleared when the count value reaches "0", even if not receiving the lock releasing packet "C2". Therefore, the address 0x4000_0000 of the memory M12 can be cleared from the buffer 15 of every router in which the address is written, regardless of whether or not the router received the lock releasing packet "C2".

In the fourth embodiment, all of the packets including the lock releasing packet "C2" can be transferred through the route selected depending on congestion situations, and thus data can be transferred more efficiently. Further, the output destination of the lock acquisition packet "C1" is not written in the buffer 15. The counter is arranged in the buffer 15, and the count value is decremented with each clock. Accordingly, the entry corresponding to the address written in the router by the lock acquisition packet "C1" can be surely cleared from the buffer 15 even if the lock releasing packet "C2" is not transferred through the same route.

(Fifth Embodiment)

In addition to the configuration of the fourth embodiment, a fifth embodiment is intended to write the lock control address of the memory whose lock cannot be acquired in the buffer 15 of each router on the route through which the lock failure packet "B2" is transferred. Hereinafter, differences from the fourth embodiment will be mainly explained.

Figure 25:
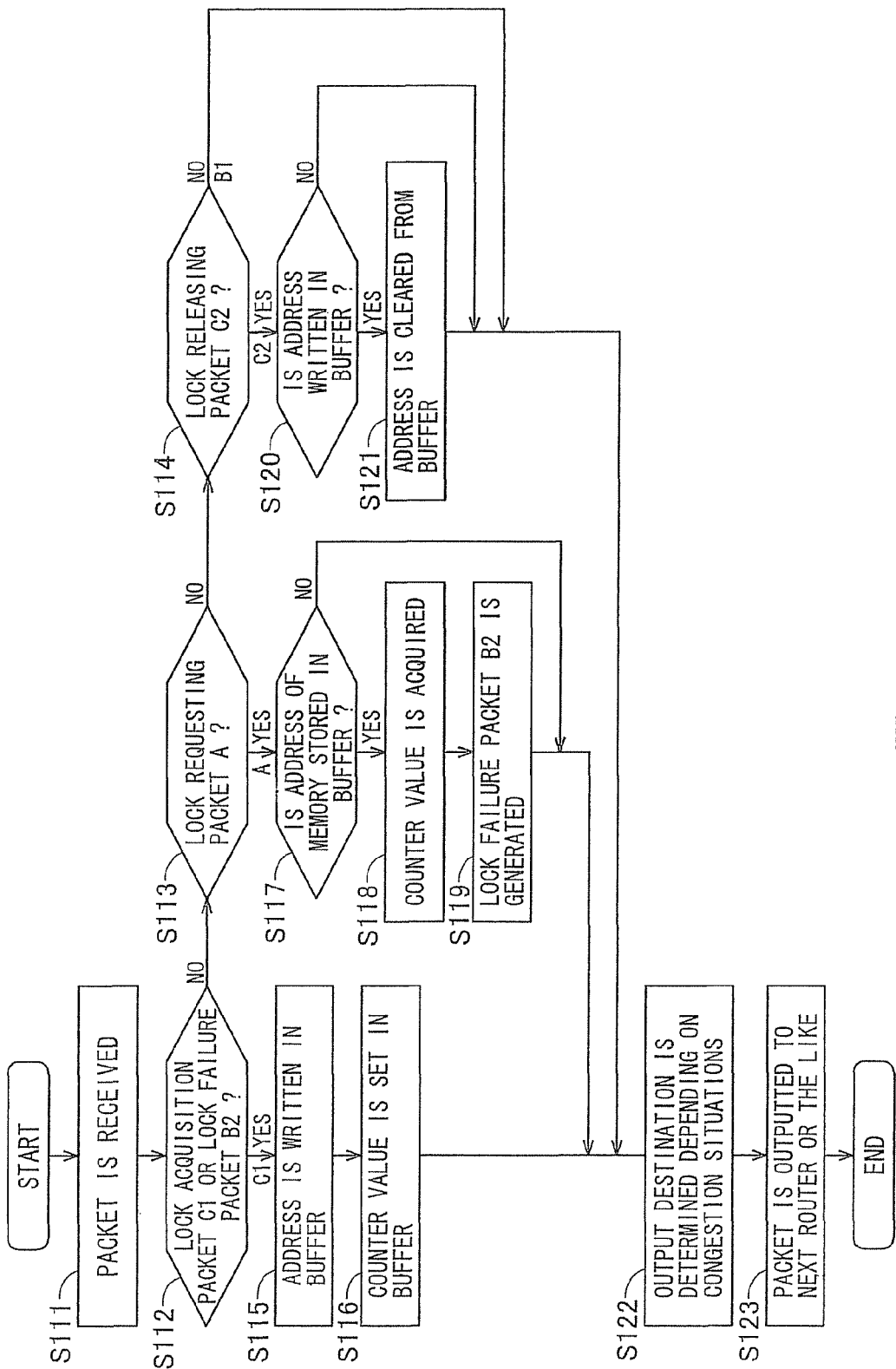
FIG. 25 is a flowchart showing an example of the processing operation performed by the router in the fifth embodiment.

In the fifth embodiment, the router and its buffer are similar to those of the fourth embodiment in structure, but different in processing operation. FIG. 25 is a flowchart showing an example of the processing operation performed by the router.

When the received packet is the lock requesting packet "A" (YES at S113) and the lock control address of the memory, which is the transmission destination of the packet is written in the buffer 15 (YES at S117), the buffer controller 14 acquires the count value at the time of receiving the lock requesting packet "A" (S118). Then, the packet generator 16 generates the lock failure packet "B2" including the count value (S119).

Then, when the received packet is the lock failure packet "B2" (YES at S112), the buffer controller 14 writes the lock control address of the memory in the buffer 15 (S115), and sets the counter (S116). The other steps are similar to those of the fourth embodiment.

Hereinafter, the processing operation performed by the data transfer system will be explained referring to FIG. 25 and FIG. 23.

Similarly to the fourth embodiment, firstly, the core C11 transmits the lock requesting packet "A" to the memory M12, and then the core C11 receives the lock success packet "B1" from the memory M12. The core C11 transmits the lock acquisition packet "C1" to the memory M12. For example, when the lock acquisition packet "C1" is received by the memory M12 through the routers R11c, R12c, and R22c, the lock control address 0x4000_0000 of the memory M12 is written in the address field of the buffer 15 in each of the routers (S115), and the estimated time is set in the counter (S116).

Here, the core C13 transmits the lock requesting packet "A" to the memory M12. When the router R12c receives the lock requesting packet "A", the buffer 15 of the router R12c is set as shown in FIG. 26A.

The lock control address 0x4000_0000 of the memory M12 is written in the buffer 15 (YES at S117). The router R12c acquires the count value 0x0500 (S118), and generates the lock failure packet "B2" including this count value (S119). Then, the router R12c outputs the lock failure packet "B2" to the router R13c in order to transmit the lock failure packet "B2" to the core C13 (S122 and S123).

When the router R13c receives the lock failure packet "B2" (S111 and YES at S112), the router R13c writes the lock control address 0x4000_0000 of the memory M12 in the buffer 15 (S115). Further, the router R13c sets, in the counter of the buffer 15, the count value included in the lock failure packet "B2" or a value obtained by subtracting the transfer time from the count value, as the estimated time (S116). For example, when the estimated time is 0x0400, the buffer 15 of the router R13c is set as shown in FIG. 26B.

As stated above, the lock control address 0x4000_0000 of the memory M12 is written in the router 13c through which the lock failure packet "B2" is transferred. Even if the lock releasing packet "C2" transmitted from the core C11 is not transferred through the router R13c, the count value in the router R13c is decremented with each clock and a corresponding entry is cleared when the count value reaches "0".

As stated above, in the fifth embodiment, the lock failure packet "B2" including the count value considering the estimated time is generated, and the count value and the lock control address of the memory whose lock cannot be acquired are written also in the router through which the lock failure packet "B2" is transferred. Therefore, when the packet from another core is received by the router in which the lock failure packet "B2" concerning the corresponding memory is written, the packet is not further transferred and thus useless data transfers can be reduced. Further, the counter is arranged in the buffer 15 and the count value is decremented with each clock, by which a corresponding entry can be surely cleared from the buffer 15.

Note that one of the second and third embodiments and one of the fourth and fifth embodiments may be combined. That is, the output destination of the lock acquisition packet "C1" is written in the router and the counter therein is set so that a corresponding entry is cleared when the router receives the lock releasing packet "C2" or when the count value reaches "0". Accordingly, the lock control address of the memory is cleared when the lock releasing packet "C2" is received even if the count value is not reaching "0", and thus the accuracy of the timing for clearing a corresponding entry can be improved.

(Sixth Embodiment)

In the first to fifth embodiments, communication for acquiring the lock is performed three times. On the other hand, in a sixth embodiment, communication for acquiring the lock is performed twice. The lock requesting packet "A"

also functions as the lock acquisition packet "C1", and the lock acquisition packet "C1" is not transferred.

FIG. 27 is a flowchart showing the steps for performing a Test & Set access based on another method. As an example, the steps performed by the core C11 to acquire a lock to the data on the memory M12 will be explained.

First, the core C11 transmits the lock requesting packet "A" to the memory M12 (S131). When the lock requesting packet "A" is received by the memory M12, the value written in the lock control address of the memory M12 is read (S132).

When the read value is set to be low (YES at S133), the memory M12 can be accessed and the value of high is promptly written in the lock control address of the memory M12 (S134). After that, the lock success packet "B1" is transmitted from the memory M12 to the core C11 (S135). On the other hand, when the read value is set to be high (NO at S133), the memory M12 cannot be accessed and the lock failure packet "B2" is transmitted from the memory M12 to the core C11 (S136).

In order to release the lock, steps in the flowchart of FIG. 2 are similarly performed, and the core C11 transmits the lock releasing packet "C2" to the memory M12. Accordingly, the value of low is written in the lock control address of the memory M12, and every one of the cores C11 to C14 can access the memory M12.

As explained above, in the sixth embodiment, at least the following four kinds of packets are transferred. The packets transferred from the core to the memory are the lock requesting packet "A" and the lock releasing packet "C2", while the packets transferred from the memory to the core are the lock success packet "B1" and the lock failure packet "B2".

Figure 28:
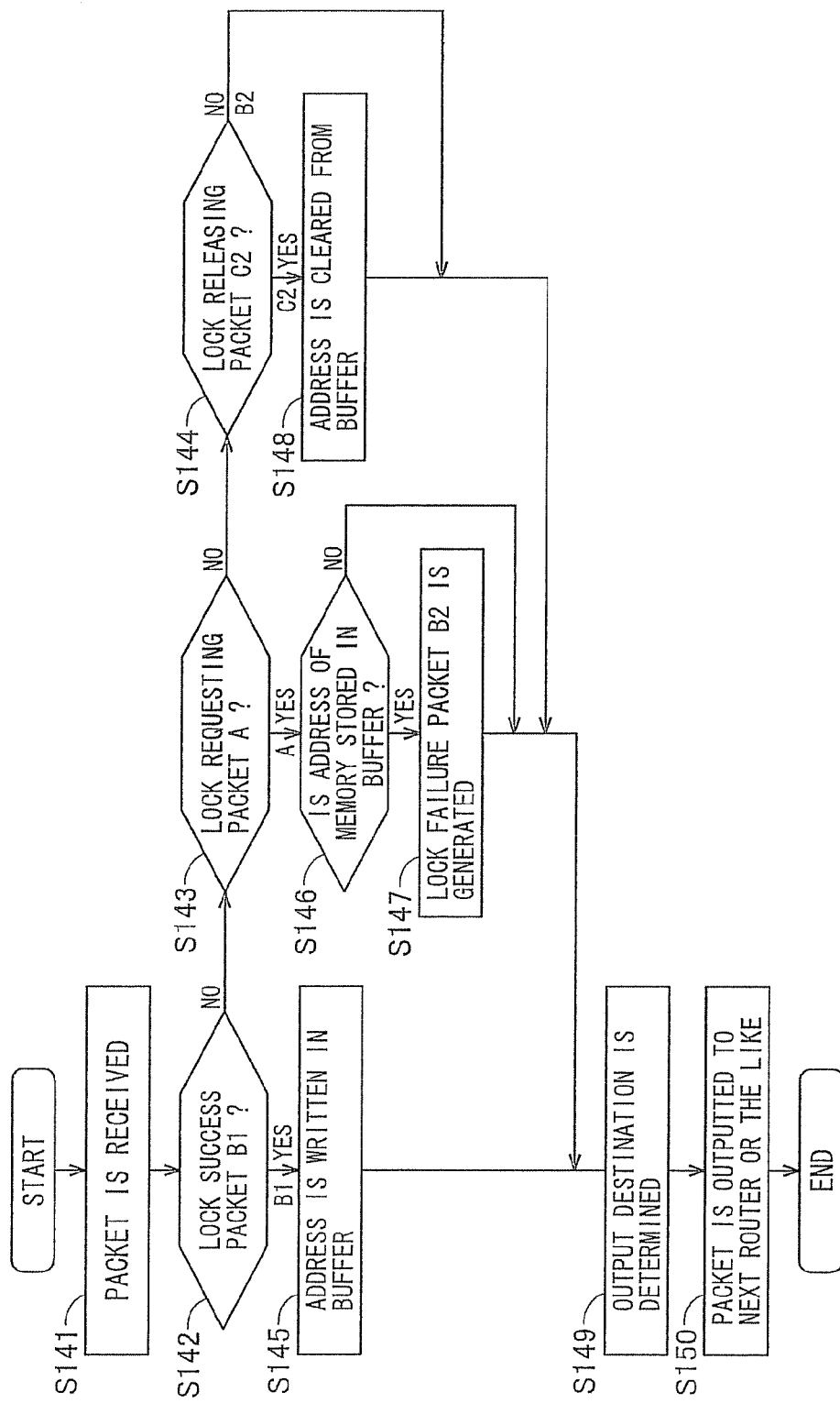
FIG. 28 is a flowchart showing an example of the processing operation performed by the router R12e in the sixth embodiment.

In the sixth embodiment, the internal configuration of a router R12e and the configuration of the buffer 15 are similar to those in the first embodiment. FIG. 28 is a flowchart showing an example of the processing operation performed by the router R12e. The sixth embodiment is based on a fixed route type, and the processing operation of the router will be explained focusing on differences from the first embodiment.

When receiving the lock requesting packet "A" (YES at S143), the processing operation performed by the router is similar to that in the first embodiment. In the sixth embodiment, when receiving the lock success packet "B1" (not the lock acquisition packet "C1") transferred from the memory to the core (YES at S142), the buffer controller 14 in the router writes the lock control address of the memory in the buffer 15 (S145). Then, when receiving the lock releasing packet "C2", the buffer controller 14 in the router clears a corresponding entry from the buffer 15 (S148).

In a fixed route type, the lock success packet "B1" and the lock releasing packet "C2" are transferred through the same route, and thus a corresponding entry written when receiving the lock success packet "B1" can be surely cleared from the buffer 15.

As stated above, in the sixth embodiment, communication for acquiring the lock is performed twice, and the lock control address of the memory whose lock cannot be acquired is written in the buffer 15 in the router by the lock success packet "B1". Therefore, useless data transfers performed when the lock cannot be acquired can be restrained, and thus the process efficiency of the entire system can be improved.

(Seventh Embodiment)

The data transfer system of the sixth embodiment operates in a fixed route type. On the other hand, an example of the data transfer system shown in a seventh embodiment operates in a variable route type. That is, the example corresponds to a case where communication for acquiring the lock is performed twice (not three times) in the second embodiment.

Figure 29:
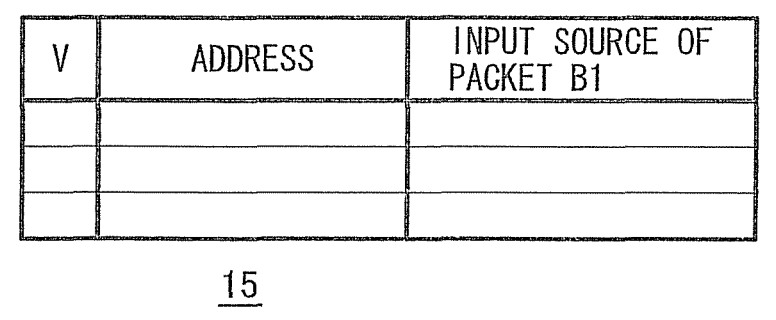

In the seventh embodiment, the internal structure of a router R12f is similar to that of the second embodiment, but the structure of the buffer 15 is different. FIG. 29 is a configuration diagram showing an example of the configuration of the buffer 15 in the router R12f. A field to write the input source of the lock success packet "B1" is arranged in the buffer 15. Written in this input source field is any one of X+, X−, Y+, and Y− each indicative of the input source of the lock success packet "B1".

Figure 30:
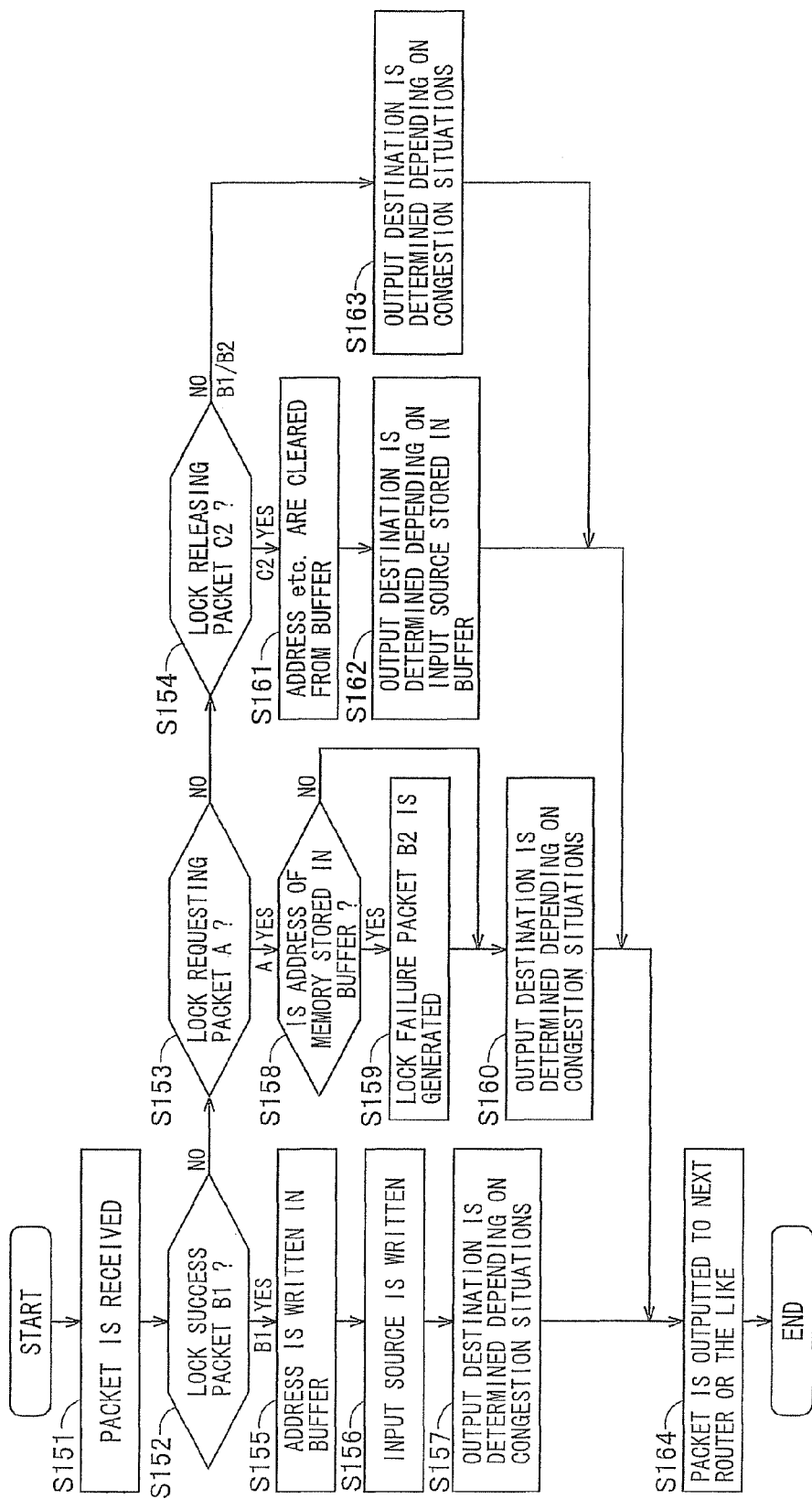
FIG. 30 is a flowchart showing an example of the processing operation performed by the router R12f in the seventh embodiment.

FIG. 30 is a flowchart showing an example of the processing operation performed by the router R12f. When receiving the lock success packet "B1" (YES at S152), the address of the memory, which is the transmission destination of the packet, and the input source of the lock success packet "B1" are written in the buffer 15 (S156), which is a main difference from the second embodiment.

Hereinafter, the processing operation performed by the data transfer system will be explained referring to FIG. 30 and FIG. 6. Note that the routers shown in FIG. 6 are given the symbols R11 and so on, but the seventh embodiment will be explained by replacing those symbols by R11f and so on.

First, the core C11 transmits the lock requesting packet "A" to the memory M12, and writes high in the lock control address 0x4000_0000 of the memory M12. Then, the lock success packet "B1" is transmitted from the memory M12 to the core C11.

The lock success packet "B1" transmitted from the memory M12 is received by a router R22f first. When the router R22f receives the lock success packet "B1" (S151 and YES at S152), the buffer controller 14 writes the lock control address 0x4000_0000 of the memory M12 in the buffer 15 (S155). Further, the lock success packet "B1" is inputted from the memory M12 to the input terminal Y+IN of the router R22f. Therefore, the buffer controller 14 writes Y+ in the input source field (S156). Accordingly, the buffer 15 of the router R22f is set as shown in FIG. 31A. Further, the router R22f outputs the lock success packet "B1" from the output terminal X-OUT or the output terminal Y−OUT depending on congestion situations (S157 and S164). Here, the lock success packet B is assumed to be outputted from the output terminal Y−OUT.

After that, the lock success packet "B1" is received by the router R12f. The router R12f operates similarly to the router R22f (S155 and S156), and the buffer 15 of the router R12f is set as shown in FIG. 31B. Further, the router 12f outputs the lock success packet "B1" from the output terminal X-OUT (S157 and S164). After that, the lock success packet "B1" is received by the router R11f. The router R11f operates similarly to the router R22f (S155 and S156), and the buffer 15 of the router R11f is set as shown in FIG. 31C. Further, the router R11f outputs the lock success packet "B1" from the output terminal Y−OUT (S157 and S164).

When the core C11 receives the lock success packet "B1", the core C11 determines that the core C11 has successfully acquired the lock. In this way, the lock control address 0x4000_0000 of the memory M12 is written in the buffer 15 of each of the routers R11f, R12f, and R22f. Therefore, when each of these routers receives the lock requesting packet "A" for acquiring the lock to the data on the memory M12 (S151 and YES at S153), the router generates the lock failure packet "B2" (S159) because the lock control address 0x4000_0000 is written in the buffer (YES at S158).

On the other hand, when releasing the lock, the router operates as follows. The core C11 transmits the lock releasing packet "C2" to the memory M12. The lock releasing packet "C2" is received by the router R11f first. When the router R11f receives the lock releasing packet "C2" (S151 and YES at S154), the router R11f clears the lock control address 0x4000_0000 of the memory M12 written in the buffer 15, and sets the (V) to be low (S161). Further, X+ is written in the input source field of the buffer 15 as shown in FIG. 31C, based on which the router R11f outputs the lock releasing packet "C2" from the output terminal X+OUT to the router R12f (S162 and S164).

The lock success packet "B1" for writing the address in the buffer 15 is transferred from the memory to the core, while the lock releasing packet "C2" is transferred in the opposite direction, namely from the core to the memory. Therefore, by outputting the lock releasing packet "C2" to the input source of the lock success packet "B1", the route for transferring the lock success packet "B1" and the route for transferring the lock releasing packet "C2" are consistent with each other. After that, the router R12f operates similarly to the router R11f. That is, a corresponding entry is cleared from the buffer 15 of the router R12f (S161), and the router R12f outputs the lock releasing packet "C2" from Y+OUT to the router R22f in accordance with Y+ written in the input source field of the buffer 15 as shown in FIG. 31B (S162 and S164).

After that, the router R22f operates similarly to the router R11f. That is, a corresponding entry is cleared from the buffer 15 of the router R22f (S161), and the router R22f outputs the lock releasing packet "C2" from Y+OUT to the memory M12 in accordance with Y+ written in the input source field of the buffer 15 as shown in FIG. 31A (S162 and S164).

When the lock releasing packet "C2" is received by the memory M12, the lock control address 0x4000_0000 of the memory M12 is set to be low, and the lock is released. In this way, the lock control address 0x4000_0000 written in the buffer 15 of each of the routers R11f, R12f, and R22f is cleared.

As stated above, in the seventh embodiment, useless data transfers can be restrained as in the sixth embodiment. Further, each of the packets excepting the lock releasing packet "C2" can be transferred after selecting a route having a smaller data transfer amount depending on congestion situations, by which data can be transferred more efficiently. Furthermore, since the input source of the lock success packet "B1" is written in the buffer 15 in the router, the lock releasing packet "C2" and the lock success packet "B1" can be transferred through the same route. Therefore, a corresponding entry written in the router by the lock success packet "B1" can be surely cleared from the buffer 15.

Note that the technique of acquiring the lock by performing communication twice as shown in FIG. 27 can be applied to the third to fifth embodiments. In order to apply the above technique to the third embodiment, not the output destination of the lock acquisition packet "C1" but the input source of the lock success packet "B1" should be written in the buffer 15 of FIG. 13. Further, in order to apply the above technique to the fourth and fifth embodiments, the lock success packet "B1" should be used instead of the lock acquisition packet "C1" in S92 of FIG. 22 and S112 of FIG. 25.

As stated above, according to the embodiments, useless data transfers can be reduced. In the example shown in each embodiment, the routers are arranged to form a matrix-like arrangement, but how to arrange the routers is not limited thereto. For example, each router may be connected to more routers in addition to four routers arranged on the left, right, top and bottom of the router. In this case, the number of input/output terminals of each router and the structure of the buffer 15 should be properly changed.

At least a part of the data transfer system explained in the above embodiments can be formed of hardware or software. When the data transfer system is partially formed of the software, it is possible to store a program realizing at least a partial function of the data transfer system in a recording medium such as a flexible disc, CD-ROM, and so on and to execute the program by making a computer read the program. The recording medium is not limited to a removable medium such as a magnetic disk, optical disk, and so on, and a fixed-type recording medium such as a hard disk device, memory, and so on can be employed.

Further, a program realizing at least a partial function of the data transfer system can be distributed through a communication line (including radio communication) such as the Internet. Furthermore, the program which is encrypted, modulated, or compressed can be distributed through a wired line or a radio link such as the Internet or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A data transfer device configured to transfer data between a plurality of data transceivers and at least one memory having a first memory area,
   wherein when one of the data transceivers has acquired an exclusive access right to the first memory area of the memory, the data transfer device stores address information corresponding to the first memory area.

2. The device of claim 1,
   wherein when the data transfer device receives, from the one of the data transceivers, first data indicating that the one of the data transceivers has acquired the exclusive access right to the first memory area of the memory, the data transfer device stores the address information corresponding to the first memory area.

3. The device of claim 1,
   wherein when the data transfer device receives, from the memory after the exclusive access right thereto has been acquired, second data indicating that the one of the data transceivers has acquired the exclusive access right to the first memory area of the memory, the data transfer device stores the address information corresponding to the first memory area.

4. The device of claim 1,
   wherein when the data transfer device receives third data for releasing the exclusive access right from the data transceiver having acquired the exclusive access right, the data transfer device clears the stored address information.

5. The device of claim 1,
   wherein the data transfer device stores an output destination of the first data indicating that the data transceiver has acquired the exclusive access right.

6. The device of claim 1,
   wherein when the data transfer device receives, from another data transceiver, an access to the memory after the exclusive access right to the first memory area of the memory has been acquired, the data transfer device transmits, back to the another data transceiver, fourth data indicating that the another data transceiver cannot acquire the exclusive access right to the memory.

7. The device of claim 6,
wherein the data transfer device stores an output destination of the fourth data.

8. The device of claim 1,
wherein the data transfer device sets a count value decremented as time passes after the address information is stored, and clears the stored address information when the count value reaches a predetermined value.

9. The device of claim 8,
wherein the data transfer device sets an estimated time for a process between the data transceiver and the memory as the count value.

10. The device of claim 1, comprising:
a storage configured to store the address information;
a data determining module configured to determine received data; and
an output module configured to determine data to be outputted based on the data determination and the address information stored in the storage.

11. The device of claim 10,
wherein the output module determines an output destination of the data depending on data transfer amounts of surrounding data transceivers.

12. A data transfer system comprising:
a plurality of data transceivers;
at least one memory configured to have a first memory area; and
a plurality of data transfer devices configured to transfer data between the plurality of data transceivers and the memory,
wherein when one of the data transceivers has acquired an exclusive access right to the first memory area of the memory, the data transfer devices store address information corresponding to the first memory area.

13. The system of claim 12, wherein when the data transfer devices receive, from the one of the data transceivers, first data indicating that the one of the data transceivers has acquired the exclusive access right to the first memory area of the memory, the data transfer devices store the address information corresponding to the first memory area.

14. The system of claim 12, wherein when the data transfer devices receive, from the memory after the exclusive access right thereto has been acquired, second data indicating that the one of the data transceivers has acquired the exclusive access right to the first memory area of the memory, the data transfer devices store the address information corresponding to the first memory area.

15. The system of claim 12, wherein when the data transfer devices receive third data for releasing the exclusive access right from the data transceiver having acquired the exclusive access right, the data transfer devices clear the stored address information.

16. The system of claim 12, wherein the data transfer devices store an output destination of the first data indicating that the data transceiver has acquired the exclusive access right.

17. The system of claim 12, wherein when the data transfer devices receives, from another data transceiver, an access to the memory after the exclusive access right to the first memory area of the memory has been acquired, the data transfer devices transmit, back to the another data transceiver, fourth data indicating that the another data transceiver cannot acquire the exclusive access right to the memory.

18. The system of claim 17, wherein the data transfer devices store an output destination of the fourth data.

19. The system of claim 12, wherein the data transfer devices set a count value decremented as time passes after the address information is stored, and clears the stored address information when the count value reaches a predetermined value.

20. The system of claim 19, wherein the data transfer devices set an estimated time for a process between the data transceiver and the memory as the count value.

* * * * *